(12) United States Patent  
Kuboi et al.

(10) Patent No.: US 11,084,701 B2
(45) Date of Patent: Aug. 10, 2021

(54) BEVERAGE SUPPLY APPARATUS

(71) Applicant: The Coca-Cola Company, Atlanta, GA (US)

(72) Inventors: Satoshi Kuboi, Kawasaki (JP); Kazuya Yajima, Osaka (JP); Masahiro Kamiyama, Osaka (JP); Yasuhiro Imazeki, Osaka (JP)

(73) Assignee: THE COCA-COLA COMPANY, Atlanta, GA (US)

( * ) Notice: Subject to any disclaimer, the term of this patent is extended or adjusted under 35 U.S.C. 154(b) by 256 days.

(21) Appl. No.: 15/521,488

(22) PCT Filed: Oct. 30, 2015

(86) PCT No.: PCT/US2015/058224
§ 371 (c)(1),
(2) Date: Apr. 24, 2017

(87) PCT Pub. No.: WO2016/069990
PCT Pub. Date: May 6, 2016

(65) Prior Publication Data
US 2017/0334701 A1 Nov. 23, 2017

(30) Foreign Application Priority Data
Oct. 31, 2014 (JP) .............................. JP2014-223634

(51) Int. Cl.
B67D 1/00 (2006.01)
B67D 1/04 (2006.01)
(Continued)

(52) U.S. Cl.
CPC ......... B67D 1/0027 (2013.01); B67D 1/0406 (2013.01); B67D 1/0857 (2013.01);
(Continued)

(58) Field of Classification Search
CPC .. B67D 1/0027; B67D 1/0888; G06F 3/04886
(Continued)

(56) References Cited

U.S. PATENT DOCUMENTS 4,658,988 A * 4/1987 Hassell ............... B67D 1/0021
137/607
4,753,370 A 6/1988 Rudick
(Continued)

FOREIGN PATENT DOCUMENTS

| JP | 2000264397 A | 9/2000 |
|---|---|---|
| JP | 2006264733 A | 10/2006 |
| JP | 3947914 B2 | 7/2007 |
| JP | 2009255990 A | 11/2009 |

(Continued)

OTHER PUBLICATIONS

Machine Translation of JP 2009255990 from Japanese Patent Office (www.jpo.go.jp).*

Primary Examiner — Jeremy Carroll
(74) Attorney, Agent, or Firm — Eversheds Sutherland (US) LLP

(57) ABSTRACT

A beverage supply apparatus for supplying multiple types of beverage. The beverage supply apparatus may include a number of nozzles for discharging multiple types of beverages, a touch panel for displaying options for the multiple types of beverages while also receiving a selection operation for one beverage from among the multiple types of beverages, a number of physical buttons that correspond to the number of nozzles and that receive an instruction for discharge of the beverage selected by the selection operation, and a control unit that specifies, from among the physical buttons, the physical button corresponding to the nozzle from which the beverage selected by the selection operation will be discharged, and controls the touch panel in such a way as to provide notification of the physical button specified.

12 Claims, 22 Drawing Sheets

(51) Int. Cl.

| | | |
|---|---|---|
| *B67D 1/08* | (2006.01) | |
| *G06F 3/0488* | (2013.01) | |
| *F16K 31/06* | (2006.01) | |
| *G06F 3/041* | (2006.01) | |
| *G06F 3/0482* | (2013.01) | |
| *G07F 17/00* | (2006.01) | |
| *G07F 13/06* | (2006.01) | |
| *G06Q 20/14* | (2012.01) | |
| *G07F 9/02* | (2006.01) | |

(52) U.S. Cl.
CPC ......... *B67D 1/0882* (2013.01); *B67D 1/0888* (2013.01); *G06F 3/04886* (2013.01); *G06Q 20/145* (2013.01); *G07F 9/023* (2013.01); *G07F 13/06* (2013.01); *G07F 13/065* (2013.01); *G07F 17/0064* (2013.01); *B67D 1/0872* (2013.01); *F16K 31/0675* (2013.01); *G06F 3/041* (2013.01); *G06F 3/0482* (2013.01)

(58) Field of Classification Search
USPC ..................................................... 222/144.5
See application file for complete search history.

(56) References Cited

U.S. PATENT DOCUMENTS

| | | | |
|---|---|---|---|
| 6,689,410 | B2 | 2/2004 | Gerber |
| 7,806,294 | B2 | 10/2010 | Gatipon et al. |
| 2007/0114244 | A1 | 5/2007 | Gatipon et al. |
| 2009/0120958 | A1 | 5/2009 | Landers et al. |
| 2010/0327017 | A1 | 12/2010 | Romanyszyn et al. |
| 2011/0017776 | A1* | 1/2011 | Metropulos .......... B67D 1/0041 222/129.1 |
| 2011/0049180 | A1* | 3/2011 | Carpenter ............ B67D 1/0022 222/1 |
| 2013/0106690 | A1* | 5/2013 | Lim ...................... G07F 13/065 345/156 |
| 2013/0180622 | A1 | 7/2013 | Scotti |
| 2014/0188271 | A1* | 7/2014 | Hernandez ........... B67D 1/0888 700/232 |
| 2014/0263410 | A1 | 9/2014 | Quartarone |
| 2016/0185587 | A1* | 6/2016 | Fukushima .......... B67D 1/0888 222/23 |

FOREIGN PATENT DOCUMENTS

| | | |
|---|---|---|
| JP | 2012510886 A | 5/2012 |
| WO | 2014034826 A1 | 3/2014 |

* cited by examiner

| Brand | Physical button |
|---|---|
| D | 3a |
| G | 3c |
| A, B, C, E, F, H, I, J, water, carbonated water | 3b |

FIG. 5

BEVERAGE SUPPLY APPARATUS

TECHNICAL FIELD

The present application relates generally to a beverage supply apparatus for supplying a number of beverages from a number of syrup supplies.

BACKGROUND OF THE INVENTION

A conventional beverage supply apparatus may produce a beverage by mixing a syrup and diluting water and then supplying the mixed beverage. This kind of beverage supply apparatus normally may produce and supply multiple types of different beverages.

Specifically, the beverage supply apparatus may include a button that receives an operation to select a beverage to be produced. When the button is depressed, the syrup required to produce the beverage is discharged from among different types of syrups stored in multiple syrup tanks. At the same time, the beverage supply apparatus may discharge diluting water that is mixed with the syrup to produce the beverage.

In addition, recent proposals for a beverage supply apparatus show multiple beverage options being displayed on a touch panel. A beverage selected on the touch panel by a user may be produced and discharged from a nozzle. Product development involving this kind of beverage supply apparatus having a touch panel may be shown in, for example, Patent Documents 1 (JP 2012-510886 A) and 2 (WO 2014/034826). With the beverage supply apparatus described in Patent Documents 1 and 2, there is only one nozzle for discharging a beverage that has been produced such that the user can easily ascertain the nozzle from which the beverage will be discharged. When there are multiple nozzles and the nozzle from which a beverage will be discharged varies according to the type of beverage, however, there may be a problem in that it may be difficult for the user to ascertain the nozzle from which the beverage selected on the touch panel will be discharged.

Furthermore, a number of visual effects may be incorporated when beverage options are displayed on a touch panel. In this case, it may be even more difficult for the user to ascertain the relationship between the beverage selected on the touch panel and the nozzle from which the beverage will be discharged. If it were possible to solve a problem such as this, however, the degree of freedom in the display on the touch panel could be increased and a display could be produced with an enhanced advertising effect.

SUMMARY OF THE INVENTION

The aim of the present application thus lies in providing a beverage supply apparatus that enables a user to ascertain easily the nozzle from which a beverage will be discharged, whatever the nature of the beverage selection screen displayed on a touch panel.

The present application relates to a beverage supply apparatus for supplying a number of types of beverage. The beverage supply apparatus may include a number of nozzles for discharging multiple types of beverages, a touch panel for displaying options for the multiple types of beverage while also receiving a selection operation for one beverage from among the multiple types of beverages, a number of physical buttons that are provided correspondingly with the nozzles and that receive an instruction operation to discharge the beverage selected by the selection operation, and a control unit that specifies, from among the physical buttons, the physical button corresponding to the nozzle from which the beverage selected by the selection operation will be discharged, and controls the touch panel in such a way as to provide notification of the physical button specified.

Furthermore, the present application relates to a beverage supply apparatus for supplying a number of types of beverages. The beverage supply apparatus may include a number of nozzles for discharging multiple types of beverages, a touch panel for displaying options for the multiple types of beverages while also receiving a selection operation for one beverage from among the multiple types of beverages, a number of physical buttons that are provided correspondingly with the nozzles and that receive an instruction operation to discharge the beverage selected by the selection operation, and a control unit that specifies, from among the physical buttons, the physical button corresponding to the nozzle from which the beverage selected by the selection operation will be discharged, and controls the physical button specified in such a way as to provide notification of the physical button specified.

The present application makes it possible for a user to ascertain easily the nozzle from which a beverage will be discharged, whatever the nature of the beverage selection screen displayed on a touch panel.

These and other features and improvements of the present application and the resultant patent will become apparent to one of ordinary skill in the art upon review of the following detailed description when taken in conjunction with the several drawings and the appended claims.

BRIEF DESCRIPTION OF THE DRAWINGS

FIG. 5 is a data table that may be used in controlling the beverage supply apparatus according to an embodiment of the present application.

DETAILED DESCRIPTION

Figure 1:
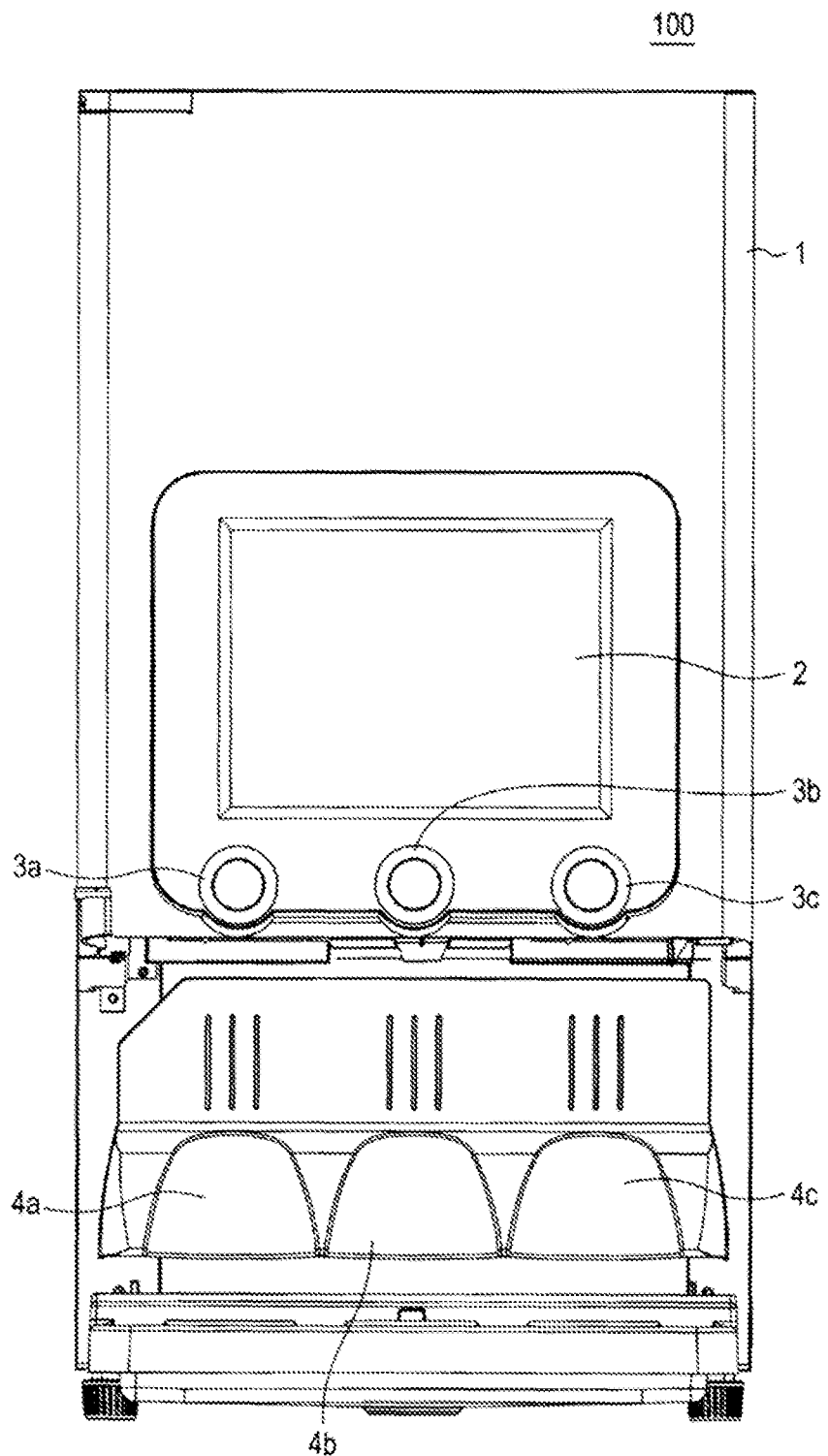
FIG. 1 is a front plan view of a beverage supply apparatus according to an embodiment of the present application.
Figure 2:
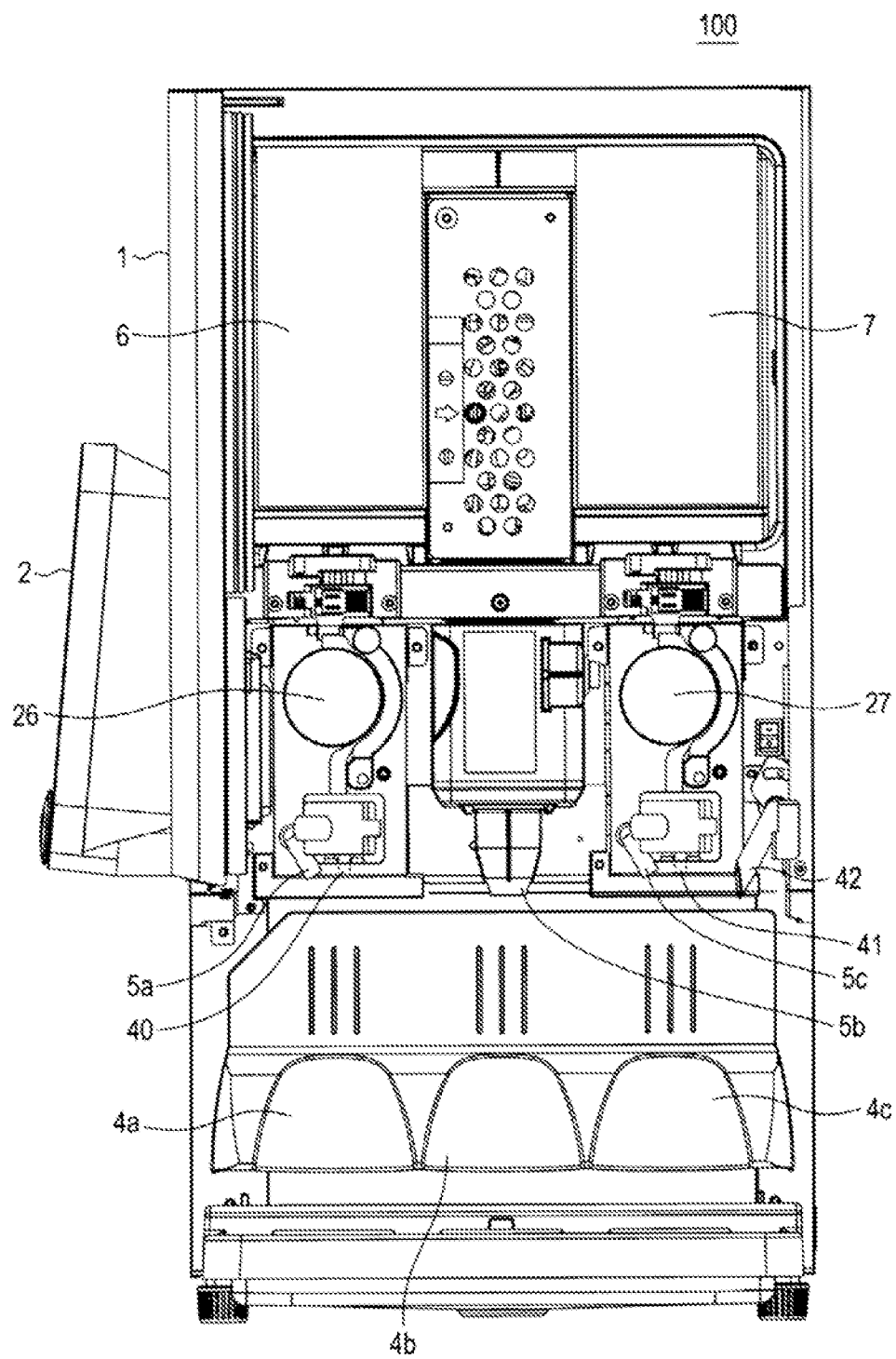
FIG. 2 is a front plan view showing the inside of the beverage supply apparatus according an embodiment of the present application with an open front surface door.

Referring now to the drawings, in which like numerals refer to like elements throughout the several views, an example of the configuration of a beverage supply apparatus 100 according to an embodiment of the present application will be described with reference to FIG. 1 through FIG. 3. FIG. 1 is a front plan view of the beverage supply apparatus 100 according to an embodiment of the present application. FIG. 2 is a front plan view showing the inside of the beverage supply apparatus 100 according to an embodiment of the present application with an open front surface door.

Figure 3:
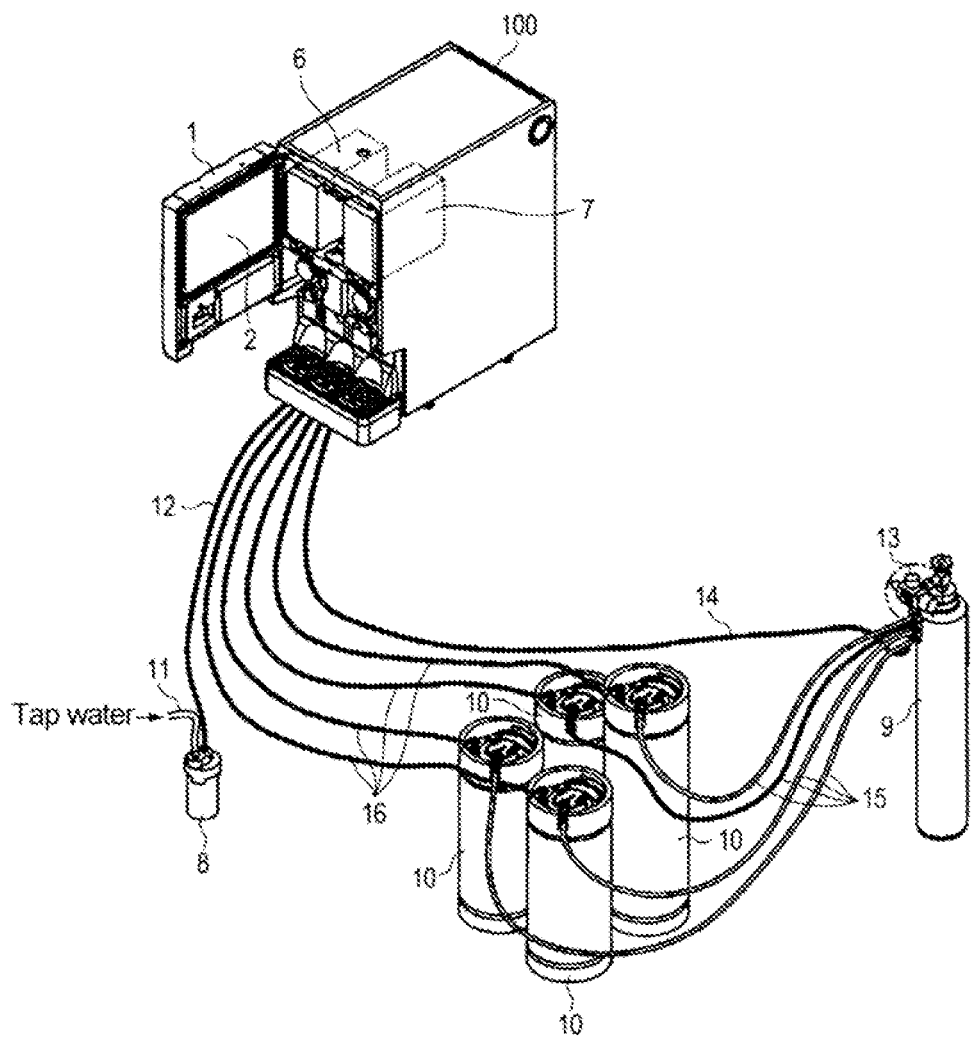
FIG. 3 is a perspective view of an external configuration of the beverage supply apparatus according to an embodiment of the present application.

FIG. 3 is a perspective view of the external configuration of the beverage supply apparatus 100 according to an embodiment of the present application.

FIG. 1 shows an example of the beverage supply apparatus 100. The beverage supply apparatus 100 may include a touch panel 2 on a front surface door 1. The front surface door 1 may be opened and closed. The touch panel 2 constitutes an operation receiving section that displays beverage options to a user of the beverage supply apparatus 100 and receives a beverage selection operation performed by the user.

Specifically, the touch panel 2 may display options for a main syrup that may be diluted with carbonated water to form a main beverage as well as options for a topping syrup that may be added to the main beverage as a flavor. The touch panel 2 thus receives a user operation for selecting the main syrup and the topping syrup.

As shown in FIG. 1, physical buttons 3a-3c may be provided below the touch panel 2. The physical buttons 3a-3c may receive a user operation for instructing the discharge of a beverage. Furthermore, container placement locations 4a-4c in which a user places a container (a glass, a cup, etc.) may be provided below the physical buttons 3a-3c.

The physical button 3a corresponds to the container placement location 4a and also corresponds to a diluting water nozzle 5a and a syrup nozzle 50 as shown in FIG. 2. The physical button 3b corresponds to the container placement location 4b and also corresponds to a nozzle 5b as shown in FIG. 2. The physical button 3c corresponds to the container placement location 4c and also corresponds to a diluting water nozzle 5c, a syrup nozzle 51, and a carbonated water nozzle 52 as shown in FIG. 2.

After a user has performed a beverage selection operation on the touch panel 2, the user may place a container in one of the container placement locations 4a-4c and may depress one of the physical buttons 3a-3c. If the physical button 3a is depressed, for example, a syrup inside a bag-in-box (referred to below as a "BIB") 6 shown in FIG. 2 may be discharged from the syrup nozzle 50 via a BIB tube pump 26, thereby forming a discharge flow. The syrup discharge flow may collide with a diluting water discharge flow discharged from the diluting water nozzle 5a and may be mixed therewith. A beverage may be produced as a result. The beverage produced in this way may be supplied to the container placed in the container placement location 4a.

If the physical button 3b is depressed, for example, a syrup and diluting water and/or carbonated water may be mixed in the nozzle 5b to produce a beverage. The beverage produced in this way may be discharged from the nozzle 5b and may be supplied to the container placed in the container placement location 4b.

If the physical button 3c is depressed, for example, a syrup inside a BIB 7 shown in FIG. 2 may be discharged from the syrup nozzle 51 via a BIB tube pump 27, thereby forming a discharge flow. The syrup discharge flow may collide with a diluting water discharge flow from the diluting water nozzle 5c and/or a carbonated water discharge flow from the carbonated water nozzle 52 and may be mixed therewith. A beverage thus may be produced as a result. The beverage produced in this way may be supplied to the container placed in the container placement location 4c.

It should be noted that each of the abovementioned beverages may be supplied to the container while the physical buttons 3a-3c are being depressed. The carbonated water nozzle 52 may be equally provided on the BIB 6 side or it may be equally provided on both the BIB 6 side and the BIB 7 side.

The BIB's 6, 7 may be provided in a refrigerated area. Syrups that need to be refrigerated may be stored in the BIB's 6, 7. Furthermore, syrups that do not need to be refrigerated may be housed inside syrup tanks 10 that will be described later in the context of FIG. 3. Here, "syrup" as referred to in the present embodiment may include not only a concentrated liquid containing sugar, but also a concentrated liquid not containing sugar (e.g., undiluted solutions of green tea, black tea, and the like).

The nozzle 5*b* may constitutes a mixing section in which a main beverage may be produced by mixing water or carbonated water with a main syrup in a predetermined ratio and an undiluted topping syrup may be mixed with the main beverage to produce a beverage (referred to below as a "flavor-added beverage"). The flavor-added beverage produced in the nozzle 5*b* may be discharged from the nozzle 5*b* into the container placed in the container placement location 4*b*.

It thus may be possible to increase considerably the options for flavors of beverage provided to a user by mixing two types of syrups, namely a main syrup and a topping syrup. A syrup that is the same as the main syrup, i.e., a normal syrup having a dilution ratio of about 1:3 to 1:10 may be used as the topping syrup. A "normal syrup" may not be a dedicated topping syrup (having a dilution ratio of about 1:120 to 1:180), rather a "normal syrup" may be a syrup that may be consumed as-is by a user on its own once diluted. Here, the main syrup and the topping syrup may be housed in the syrup tanks 10 shown in FIG. 3. It should be noted that the nozzle 5*b* also discharges water alone or carbonated water alone, in addition to discharging the flavor-added beverage.

As shown in FIG. 3, the beverage supply apparatus 100 may be provided with a purification filter 8, a carbon dioxide gas cylinder 9, and a number of syrup tanks 10. The purification filter 8 may purifies tap water supplied from a braided tube 11 and may supply the purified water to inside the beverage supply apparatus 100 through a braided tube 12. The braided tube 12 may be connected to a carbonator (not depicted) provided inside the beverage supply apparatus 100, to the diluting water nozzles 5*a*, 5*c*, and to the nozzle 5*b*.

The carbon dioxide gas cylinder 9 may store compressed carbon dioxide gas. The carbon dioxide gas may be supplied to the carbonator through a braided tube 14 at a predetermined pressure (e.g., about 0.6 MPa) that may be set by a gas regulator 13. Furthermore, the carbon dioxide gas may be supplied to each syrup tank 10 through braided tubes 15 at a predetermined pressure (e.g., about 0.2 MPa) set by the gas regulator 13. The number of syrup tanks 10 may store different syrups. As mentioned above, these syrups may be used as a main syrup or a topping syrup. The syrups may be pushed out by gas pressure supplied from the carbon dioxide gas cylinder 9 and supplied to the nozzle 5*b* through the braided tubes 16.

Figure 4:
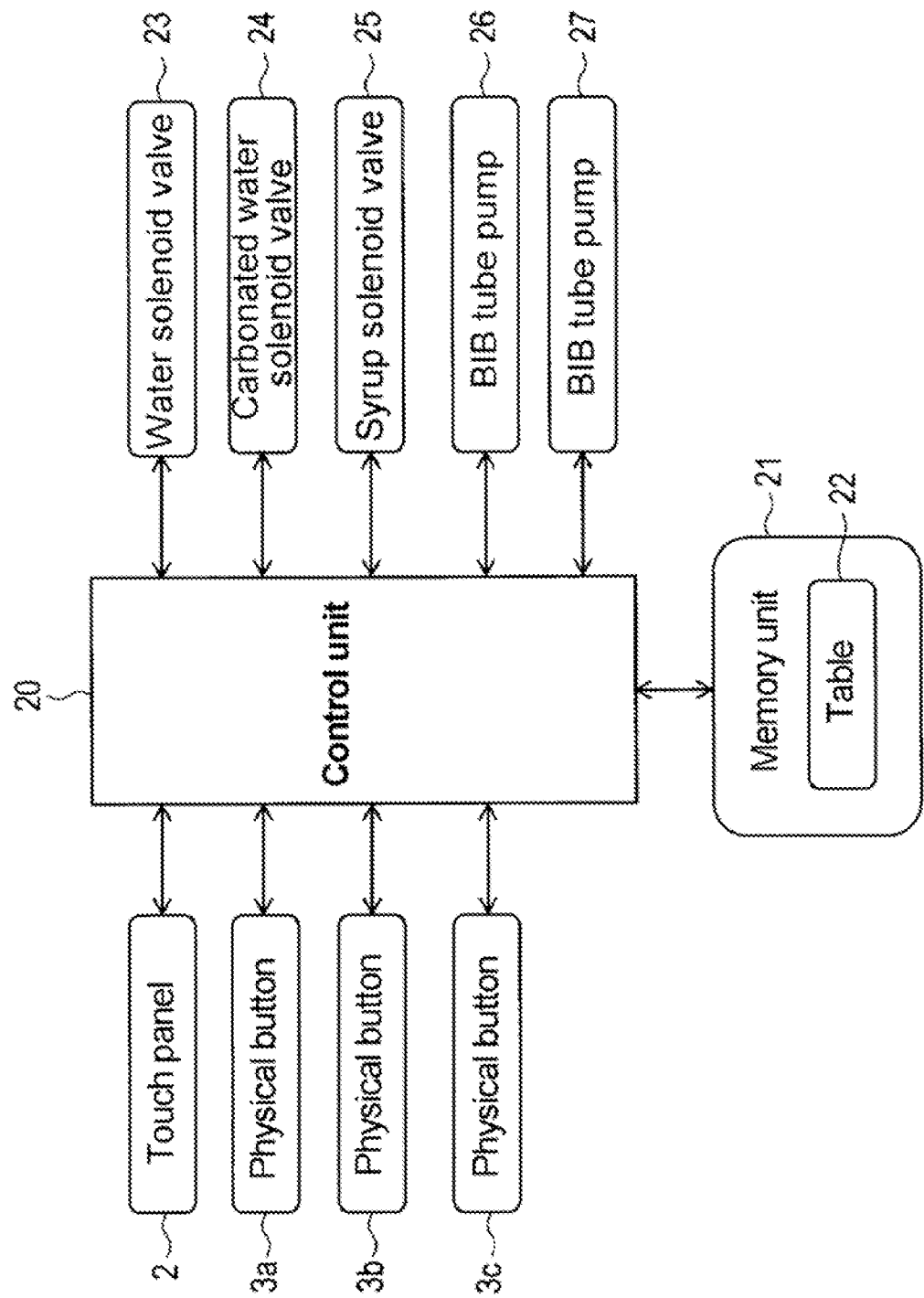
FIG. 4 is a functional block diagram of the beverage supply apparatus according to an embodiment of the present application.

A control unit 20 of the beverage supply apparatus 100 according to an embodiment of the present application and the configuration peripheral thereto will be described next in the context of FIG. 4. FIG. 4 is a functional block diagram of the beverage supply apparatus 100 according to an embodiment of the present application.

The beverage supply apparatus 100 may include, in addition to the touch panel 2 and physical buttons 3*a*-3*c* illustrated in FIG. 1: the control unit 20, a memory unit 21, a water solenoid valve 23, a carbonated water solenoid valve 24, a syrup solenoid valve 25, and a number of BIB tube pumps 26, 27. The control unit 20 may be a control device such as a central processing unit (CPU). The control unit 20 may control the functional units provided in the beverage supply apparatus 100. The memory unit 21 may be a memory device such as a read only memory (ROM) or a random access memory (RAM). The memory unit 21 may store a data table 22 and the like as will be described in more detail below. The control unit 20 may control beverage supply and may control the touch panel 2 in accordance with data read out from the memory unit 21. Control of the touch panel 2 will be described in detail below in the context of FIGS. 6-22.

Control of beverage supply will be described here first of all. When a user performs an operation to select a beverage on the touch panel 2, the control unit 20 may read out data relating to the selected beverage from the memory unit 21 and may produce a beverage in accordance with the data. For example, this data may constitutes data relating to the dilution ratio of water, carbonated water, main syrup, and topping syrup; setting data for controlling opening/closing of the solenoid valves (water solenoid valve 23, carbonated water solenoid valve 24, and syrup solenoid valve 25) in accordance with the dilution ratio; and setting data for controlling driving of the BIB tube pumps 26, 27.

It should be noted that the following description relates to a case in which the supply of the water, the carbonated water, the main syrup, and the topping syrup are controlled by opening/closing of the solenoid valves, but the supply may equally be controlled by means of a pump or the like.

Furthermore, when an operation to select a beverage is performed by a user on the touch panel 2, the control unit 20 may read out the table 22 from the memory unit 21. The table 22 constitutes information indicating the physical buttons 3*a*-3*c* corresponding to the beverage selected by the user.

An example of the table 22 is shown in FIG. 5. As shown in FIG. 5, information relating to the physical buttons 3*a*-3*c* corresponding to the nozzles from which a beverage of the relevant brand is discharged may be registered in the table 22 in association with beverage brands. It should be noted that the brands are indicated by letter in FIG. 5.

For example, brand D is associated with the physical button 3*a* in the table 22. When a beverage of brand D is selected by a user and the physical button 3*a* is depressed, a beverage of brand D produced in the manner described above is therefore supplied to a container placed in the container placement location 4*a* corresponding to the physical button 3*a*.

Brand G is associated with the physical button 3*c* in the table 22. When a beverage of brand G is selected by a user and the physical button 3*c* is depressed, a beverage of brand G produced in the manner described above is therefore supplied to a container placed in the container placement location 4*c* corresponding to the physical button 3*c*.

Brands A-C, E, F, and H-J, water, and carbonated water may be associated with the physical button 3*b*. When a beverage that is any of brands A-C, E, F, and H-J, water, or carbonated water is selected by a user and the physical button 3*b* is depressed, a beverage (e.g., a flavor-added beverage, water, or carbonated water) produced in the manner described above is therefore supplied to a container placed in the container placement location 4*b* corresponding to the physical button 3*b*. It should be noted that although water and carbonated water are not brands, water and carbonated water are treated as a type of brand in this mode of embodiment for the sake of convenience.

When the control unit 20 detects that one of the physical buttons 3a-3c has been depressed, the control unit 20 may perform at least one control operation that involves opening and closing the solenoid valves 23-25 or driving the BIB tube pumps 26, 27 in order to supply water, carbonated water, main syrup, or topping syrup to the nozzle (diluting water nozzles 5a, 5c, nozzle 5b or syrup nozzles 50, 51) corresponding to the physical button 3a-3c that has been depressed.

For example, if a beverage of any of the brands A-C, E, F, and H-J has been selected by a user and the physical button 3b has been depressed, the control unit 20 sets to an open state the syrup solenoid valve 25 provided between the nozzle 5b and the syrup tank 10 in which syrup (main syrup) of the selected brand is stored, while also setting to an open state the water solenoid valve 23 and/or the carbonated water solenoid valve 24. It should be noted that when the water solenoid valve 23 and the carbonated water solenoid valve 24 are set to an open state, the control unit 20 may alternately set the water solenoid valve 23 and the carbonated water solenoid valve 24 to an open state, or set the solenoid valves to an open state simultaneously. By this means, the syrup and the water and/or carbonated water may be mixed in the nozzle 5b and the beverage obtained as a result is discharged from the nozzle 5b.

It should be noted that when a flavor-added beverage has been selected by the user, the control unit 20 sets to an open state the syrup solenoid valve 25 provided between the nozzle 5b and the syrup tank 10 in which is stored a topping syrup of the flavor (e.g., a fruit flavor such as orange or grape) selected by the user, in addition to setting to an open state the syrup solenoid valve 25 provided between the nozzle 5b and the syrup tank 10 in which the main syrup is stored. By this means, a topping syrup also may be supplied to the nozzle 5b in addition to the main syrup and it may be possible to produce a flavor-added beverage by mixing these with water and/or carbonated water.

When water has been selected by a user and the physical button 3b has been depressed, the control unit 20 may set to an open state the water solenoid valve 23 provided between the purification filter 8 and the nozzle 5b. Water may be discharged from the nozzle 5b as a result. When carbonated water has been selected by a user and the physical button 3b corresponding to the nozzle 5b has been depressed, the control unit 20 may set to an open state the carbonated water solenoid valve 24 provided between the carbonator and the nozzle 5b. Carbonated water may be discharged from the nozzle 5b as a result.

Likewise, when a beverage of the brand D has been selected by a user and the physical button 3a has been depressed, the control unit 20 may drive, under predetermined conditions, the BIB tube pump 26 provided between the syrup nozzle 50 and the BIB 6 in which syrup of the selected brand D is stored. At the same time, the control unit 20 also may set the water solenoid valve 23 to an open state and cause diluting water to be discharged from the diluting water nozzle 5a. As a result, a beverage in which syrup of the brand D and diluting water are mixed may be supplied to a container placed in the container placement location 4a.

Furthermore, when a beverage of the brand G has been selected by a user and the physical button 3c has been depressed, the control unit 20 may drive, under predetermined conditions, the BIB tube pump 27 provided between the syrup nozzle 51 and the BIB 7 in which syrup of the selected brand G is stored. At the same time, the control unit 20 also may set the water solenoid valve 23 and/or the carbonated water solenoid valve 24 to an open state and cause diluting water and/or carbonated water to be discharged from the diluting water nozzle 5c and/or the carbonated water nozzle 52. As a result, a beverage in which syrup of the brand G and water and/or carbonated water are mixed may be supplied to a container placed in the container placement location 4c.

An example of beverage supply control implemented by means of the control unit 20 has been described above. An example of controlling screen display on the touch panel 2 implemented by means of the control unit 20 will be described next in the context of FIGS. 6-22.

Control Example 1

Figure 6:
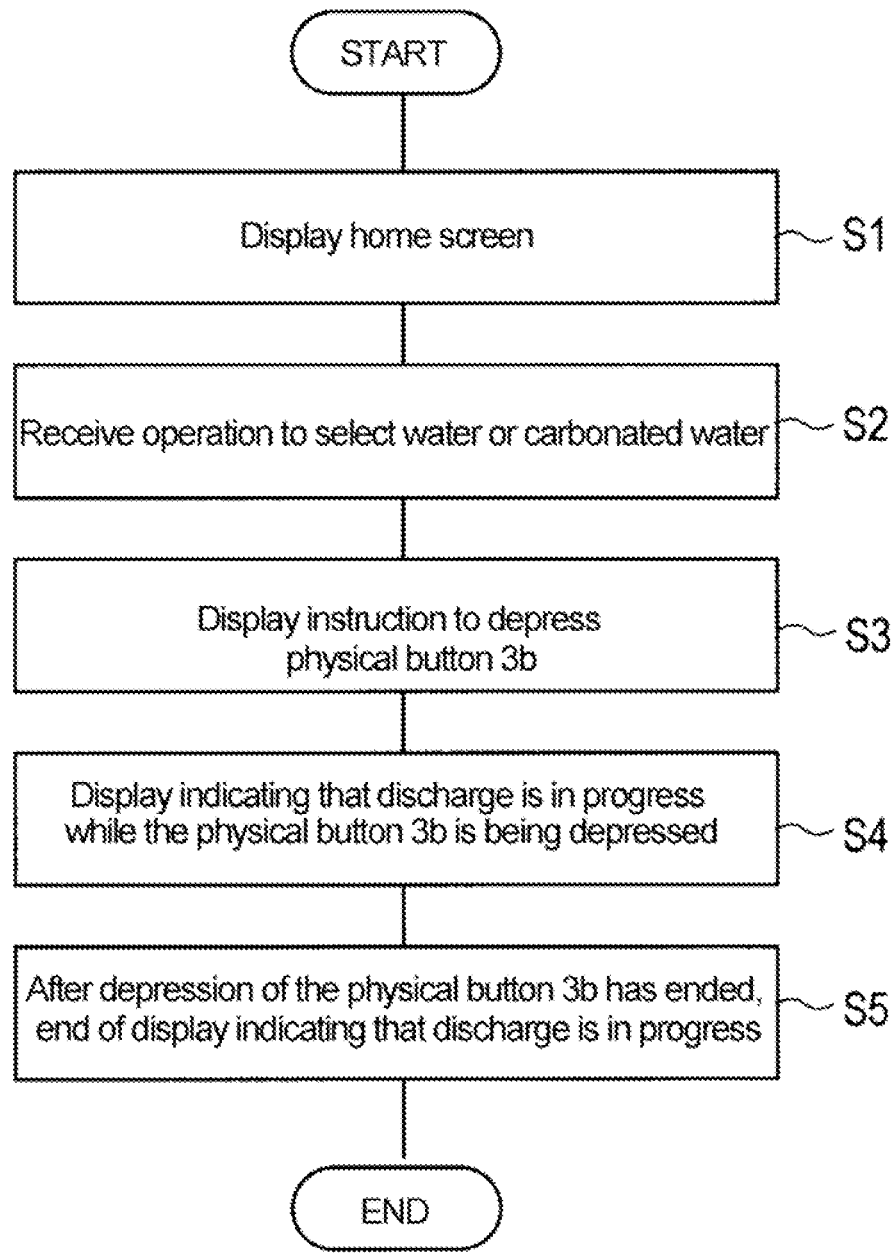
FIG. 6 is a flowchart showing Control Example 1 of the beverage supply apparatus according to an embodiment of the present application.
Figure 7:
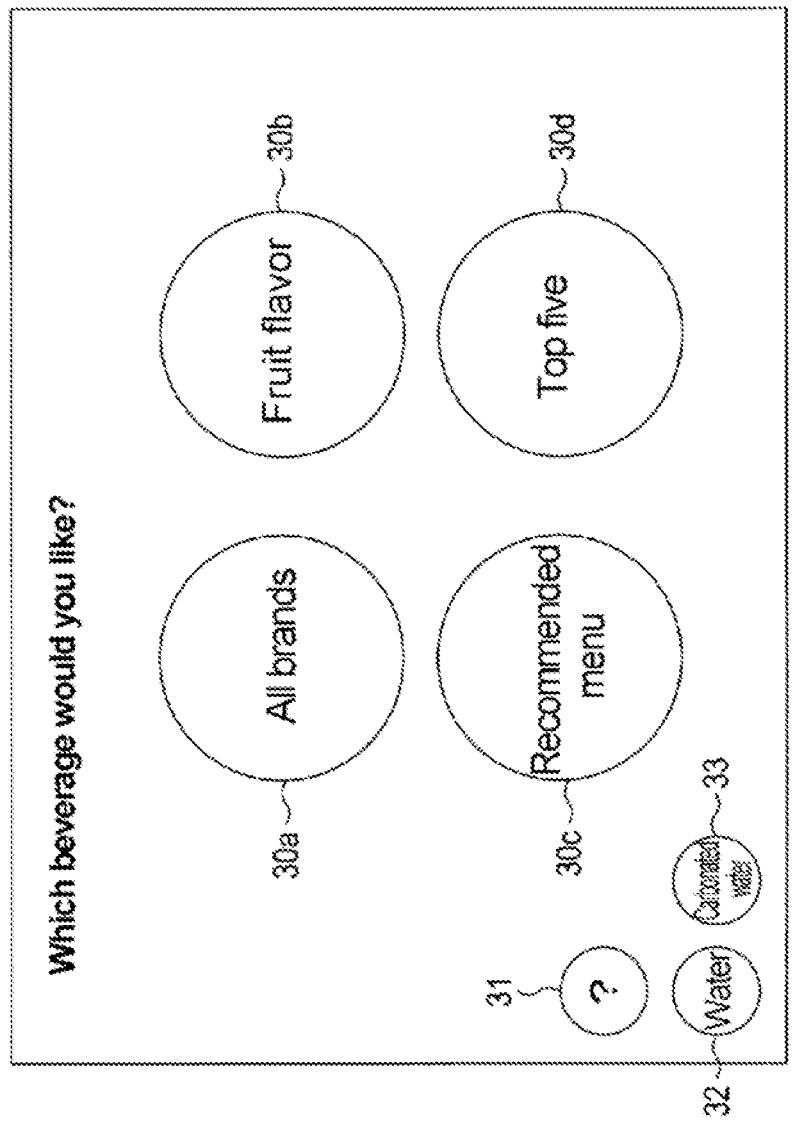
FIG. 7 shows a display example of a home screen of the beverage supply apparatus according to an embodiment of the present application.
Figure 8:
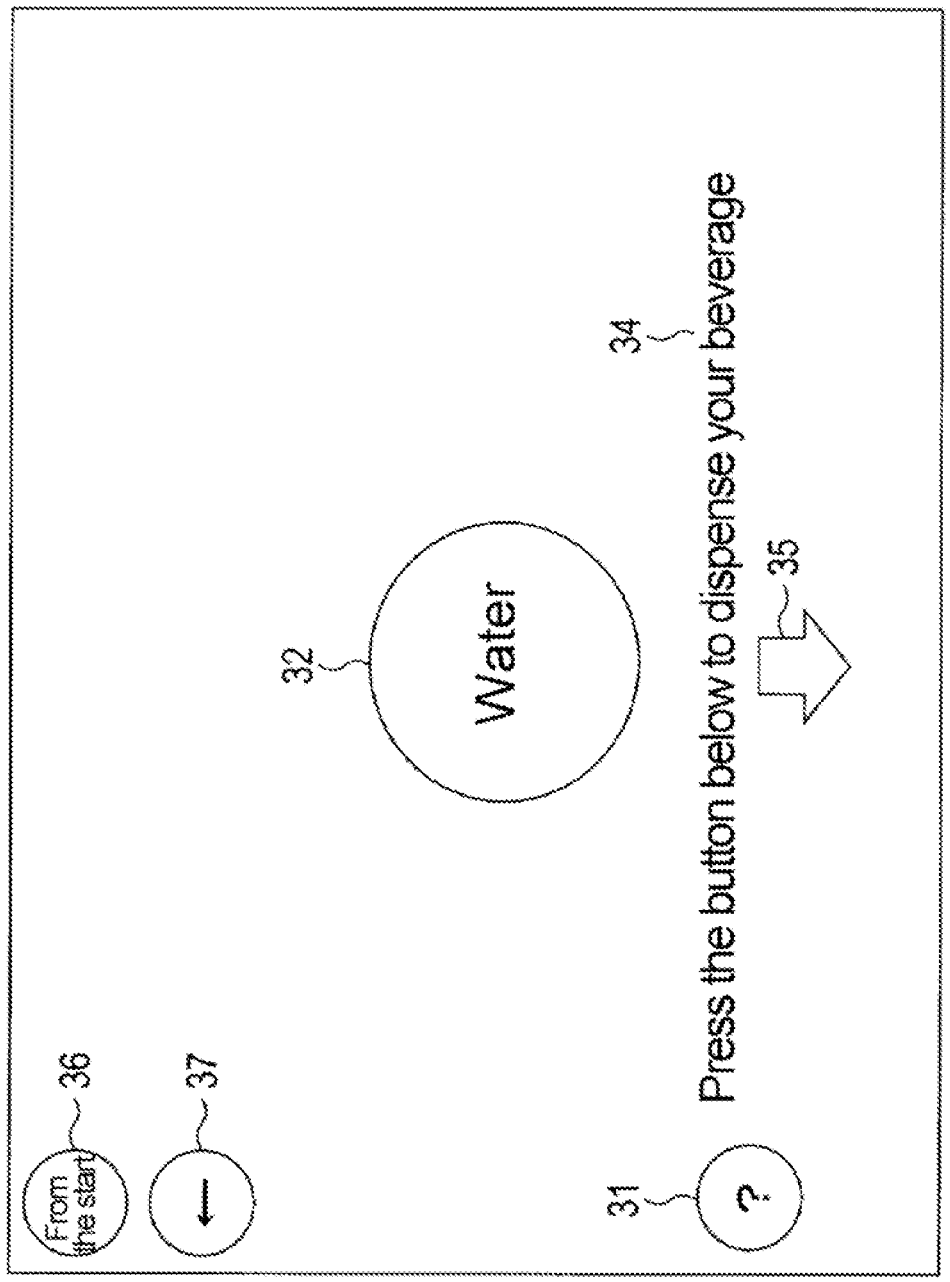
FIG. 8 shows a display example of a depression instruction screen according to Control Example 1 of the beverage supply apparatus according to an embodiment of the present application.
Figure 9:
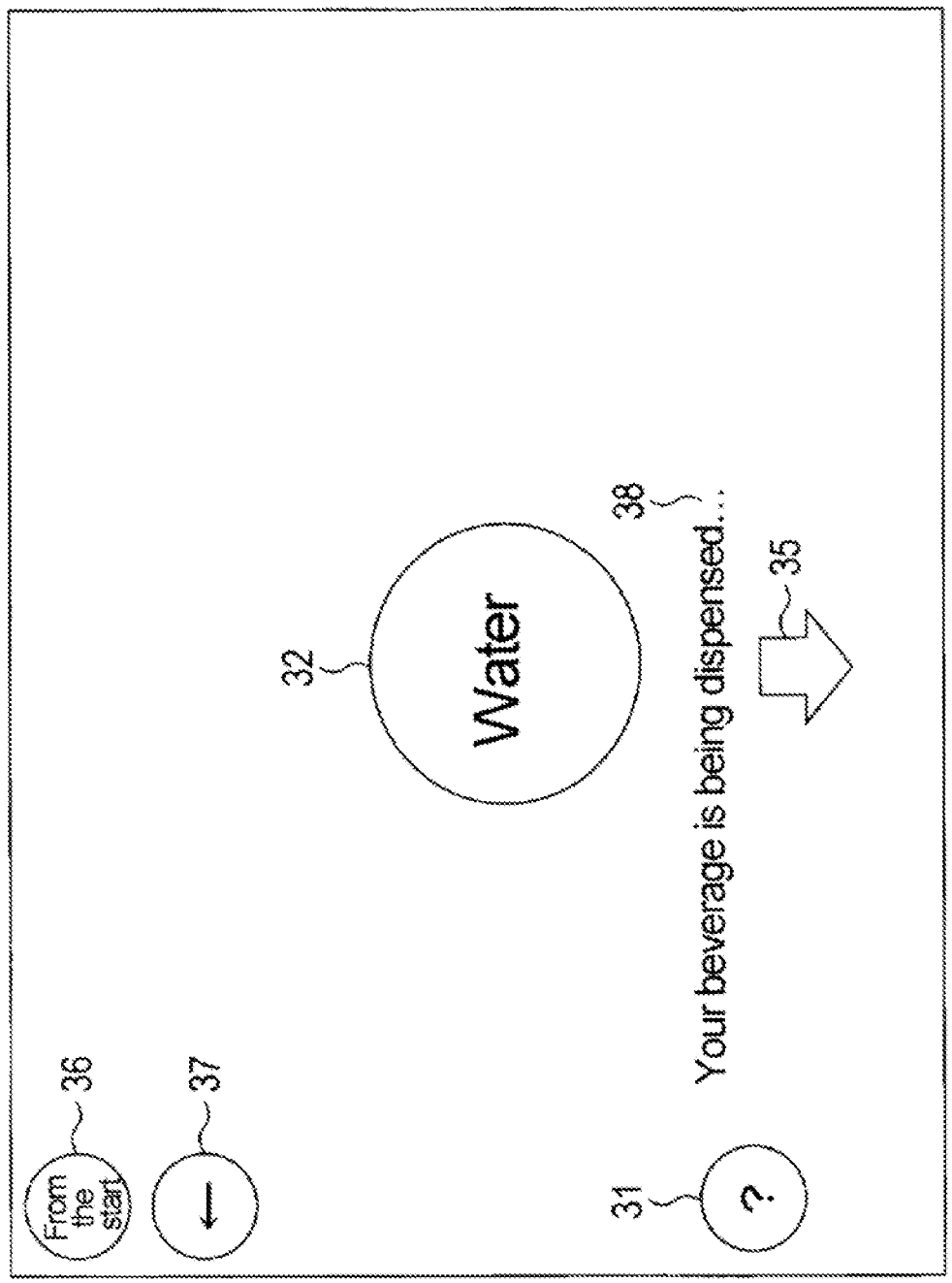
FIG. 9 shows a display example of a discharge-in-progress screen according to Control Example 1 of the beverage supply apparatus according to an embodiment of the present application.

An example of control when water or carbonated water may be selected will be described first of all in the context of FIGS. 6-9. FIG. 6 is a flowchart showing this control example. FIGS. 7-9 show examples of the display on the screen of the touch panel 2.

The control unit 20 first may read out image data of a home screen stored in the memory unit 21 and cause the touch panel 2 to display the home screen (step S1). FIG. 7 shows an example of the home screen display. As is shown, category selection buttons 30a-30d, a help button 31, a water button 32 and a carbonated water button 33 may be displayed on the home screen. The category selection buttons 30a-30d are buttons for receiving a touch operation (referred to below as "depression") performed by a user when the user selects a category of beverage. A case in which the category selection button 30a is depressed will be described in Control Example 2. A case in which the category selection button 30b is depressed will be described in Control Example 3. A case in which the category selection button 30c or 30d is depressed will be described in Control Example 4.

The help button 31 is a button that may be depressed when a user wishes to know how to operate the beverage supply apparatus 100 (e.g., how to operate the screen that is currently being displayed). When the help button 31 has been depressed, the control unit 20 reads out data relating to the method of operation that is stored in the memory unit 21 and causes the touch panel 2 to display that data. The water button 32 is a button that is depressed when the user selects water as a beverage. The carbonated water button 33 is a button that is depressed when the user selects carbonated water as a beverage.

Here, the control unit 20 determines that an operation to select water or carbonated water has been received as a result of the water button 32 or the carbonated water button 33 having been depressed by the user (step S2). In this case, the control unit 20 may specify the physical button 3b corresponding to the nozzle 5b for discharging water or carbonated water (in other words, the container placement location 4b) in accordance with the table 22 read out from the memory unit 21. The control unit 20 then may cause the touch panel 2 to display an instruction to depress the physical button 3b (step S3). For example, the control unit 20 reads out from the memory unit 21 image data of a depression instruction that instructs a user to depress the physical button 3b and causes the touch panel 2 to display that image.

FIG. 8 shows an exemplary image of this depression instruction. Specifically, FIG. 8 shows an example of a depression instruction screen when water has been selected. As is shown, the water button 32 may be moved to the center of the depression instruction screen and displayed at a larger size and a message 34 and an arrow 35 may be displayed underneath. The message 34 may instruct the user to depress the physical button 3b. Furthermore, the arrow may indicate the positions of the physical button 3b, the nozzle 5b, and the container placement location 4b.

Displaying this kind of arrow 35 makes it easy for the user to ascertain that the physical button to be depressed is the physical button 3b and also makes it easy for the user to ascertain that the beverage will be supplied to the position of the container placement location 4b corresponding to the physical button 3b. It should be noted that when carbonated water has been selected, the carbonated water button 33 may be moved and displayed at a larger size instead of the water button 32 shown in FIG. 8.

Return buttons 36, 37 may be displayed in the top left of the depression instruction screen shown in FIG. 8. The return button 36 is a button that may be depressed when the user wishes to return to the home screen. The return button 37 is a button that may be depressed when the user wishes to return to the preceding screen. When the return button 36 or 37 has been depressed, the control unit 20 may cause a move to the home screen or to the preceding display screen.

If the user then depresses the physical button 3b, the control unit 20 may cause the selected beverage (e.g., water or carbonated water in this case) to be discharged from the nozzle 5b while the physical button 3b is being depressed. The control unit 20 also may cause the touch panel 2 to display the fact that the selected beverage is in the process of being discharged (step S4). For example, the control unit 20 may read out image data of a discharge-in-progress image stored in the memory unit 21 and may cause the touch panel 2 to display that image.

FIG. 9 shows an example of the display of the discharge-in-progress screen including the abovementioned image. Specifically, FIG. 9 shows an example of the discharge-in-progress screen when water has been selected.

As is shown, the water button 32 may be moved to the center of the discharge-in-progress screen and displayed at a larger size and a message 38 and an arrow 35 may be displayed underneath. The message 38 may inform the user that the beverage is in the process of being discharged. Furthermore, the arrow may indicate the positions of the physical button 3b, the nozzle 5b, and the container placement location 4b in the same way as in the abovementioned depression instruction screen. It should be noted that when carbonated water has been selected, the carbonated water button 33 may be moved and displayed at a larger size instead of the water button 32 shown in FIG. 9.

When the user then stops depressing the physical button 3b, the control unit 20 may cause discharge of the beverage from the nozzle 5b to stop and also ends the display indicating that the beverage is in the process of being discharged (step S5). In this case, the control unit 20 may control the touch panel 2 in such a way that the display moves from the discharge-in-progress screen shown in FIG. 9 to the depression instruction screen shown in FIG. 8. Here, the control unit 20 may save the beverage information for a given time (e.g., a few seconds) from the end of discharge of the beverage and also may control the touch panel 2 in such a way so as to maintain the display of the depression instruction screen while awaiting another operation by the user to depress the physical button 3b.

If the user performs another operation to depress the physical button 3b, the control unit 20 may cause the same beverage as that which was discharged immediately before to be discharged from the nozzle 5b in accordance with the saved information. As a result, the user can easily top off the beverage without again performing the abovementioned beverage selection operation.

When a given time has elapsed from the end of discharge of the beverage, the control unit 20 may control the touch panel 2 in such a way that the display returns from the depression instruction screen shown in FIG. 8 to the home screen shown in FIG. 7. It should be noted that in the description given above, the beverage may be discharged only while the physical button 3b is being depressed. It may be equally feasible for a given amount of the beverage to be discharged when the physical button 3b is pressed for a time. The discharge-in-progress screen shown in FIG. 9 may be displayed while the beverage is being discharged. Moreover, the same also applies to the control examples below.

Control Example 2

Figure 10:
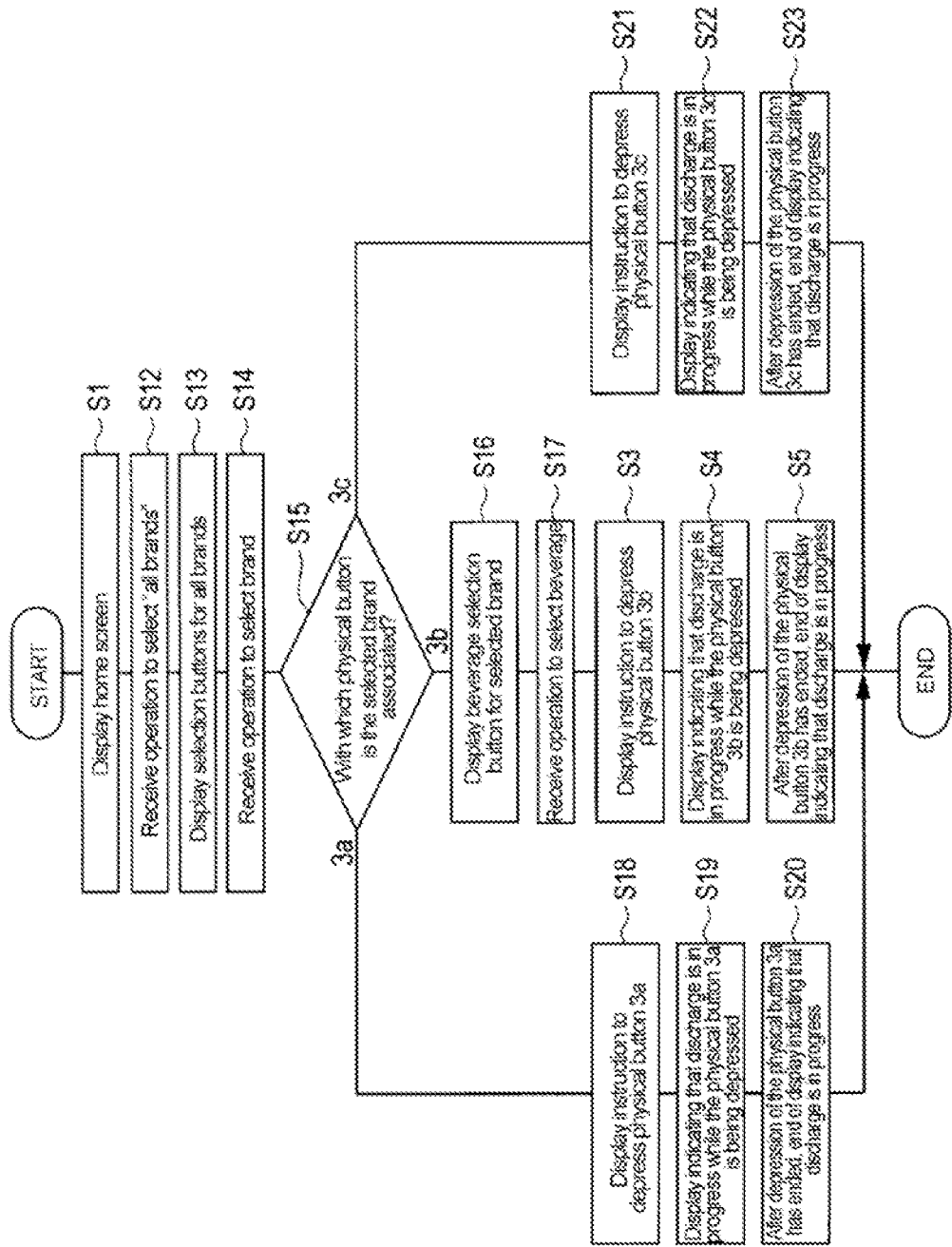
FIG. 10 is a flowchart showing Control Example 2 of the beverage supply apparatus according to an embodiment of the present application.

An example of control when the "all brands" category shown in FIG. 7 is selected will be described next in the context of FIGS. 10-17. FIG. 10 is a flowchart showing this control example. Furthermore, FIGS. 11-17 show examples of the display on the screen of the touch panel 2.

The control unit 20 may read out image data of the home screen stored in the memory unit 21 and cause the touch panel 2 to display the home screen (step S1). The home screen shown in FIG. 7 is displayed on the touch panel 2 as a result. Here, the control unit 20 may determine that an operation to select the "all brands" category has been received as a result of the category selection button 30a having been depressed by the user (step S12). In this case, the control unit 20 may cause the touch panel 2 to display the selection buttons for all brands (step S13). For example, the control unit 20 may read out from the memory unit 21 image data of the brand selection screen including the selection buttons for all brands and cause the touch panel 2 to display that screen.

Figure 11:
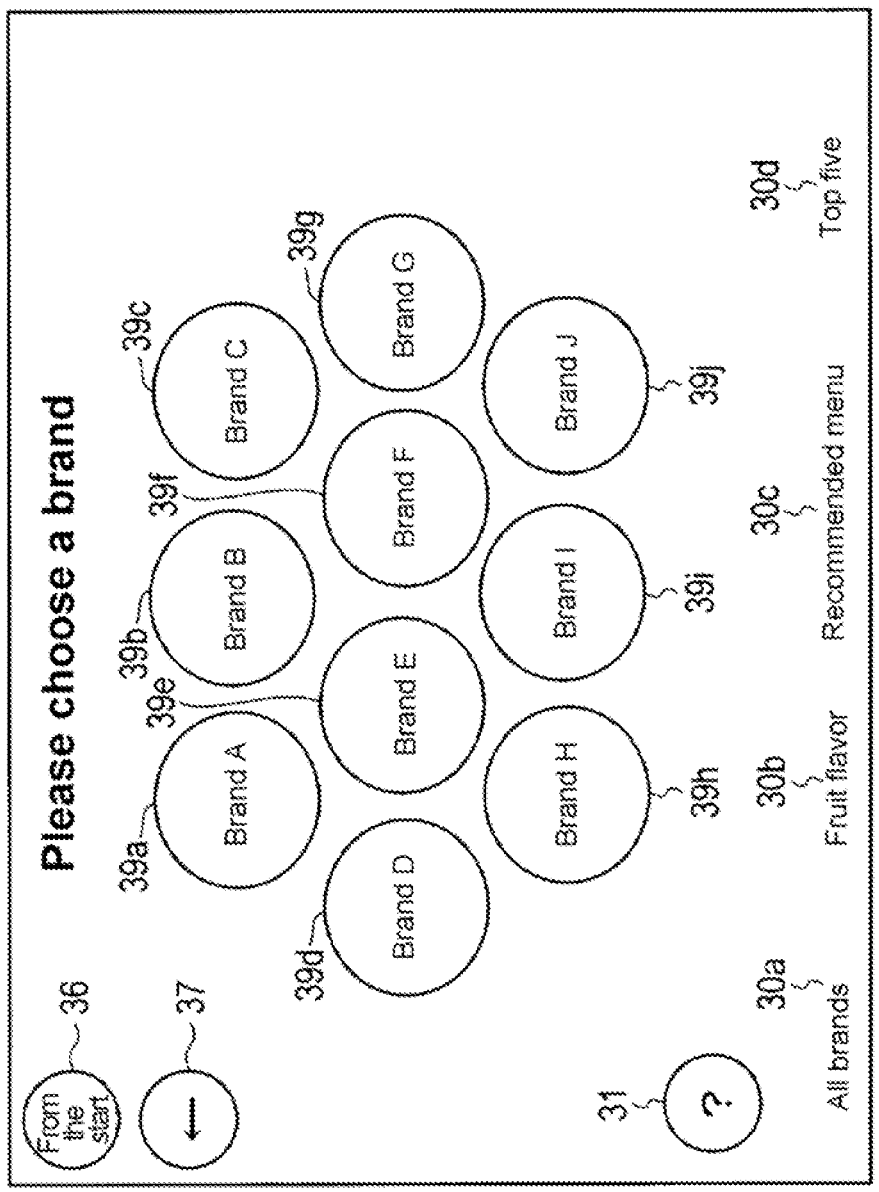
FIG. 11 shows a display example of a brand selection screen according to Control Example 2 of the beverage supply apparatus according to an embodiment of the present application.

FIG. 11 shows an example of the display of the brand selection screen. As shown in FIG. 11, brand selection buttons 39a-39j may be displayed on the brand selection screen. The brand selection buttons 39a-39j may be buttons that are depressed when the user selects a brand of beverage. Furthermore, the brand selection buttons 39a-39j may correspond to the brands A-J shown in FIG. 5, respectively. Here, the control unit 20 may determine that an operation to select a brand has been received as a result of any of the brand selection buttons 39a-39j having been depressed by the user (step S14). In this case, the control unit 20 may specify the physical button corresponding to the nozzle for supplying a beverage of the selected brand (in other words, the container placement location where the user should place the container), in accordance with the table 22 read out from the memory unit 21 (step S15).

If the selected brand is associated with the physical button 3a (step S15: 3a), the processing of step S18 and onwards may be implemented. If the selected brand is associated with the physical button 3c (step S15: 3c) the processing of step S21 and onwards may be implemented. If the selected brand is associated with the physical button 3b (step S15: 3b), the processing of step S16 and onwards may be implemented.

The processing of step S16 and onwards will be described first of all. The control unit 20 may cause the touch panel 2 to display the beverage selection button for the selected brand (step S16). For example, the control unit 20 may read out image data of the beverage selection screen stored in the memory unit 21 and may cause the touch panel 2 to display that beverage selection screen.

Figure 12:
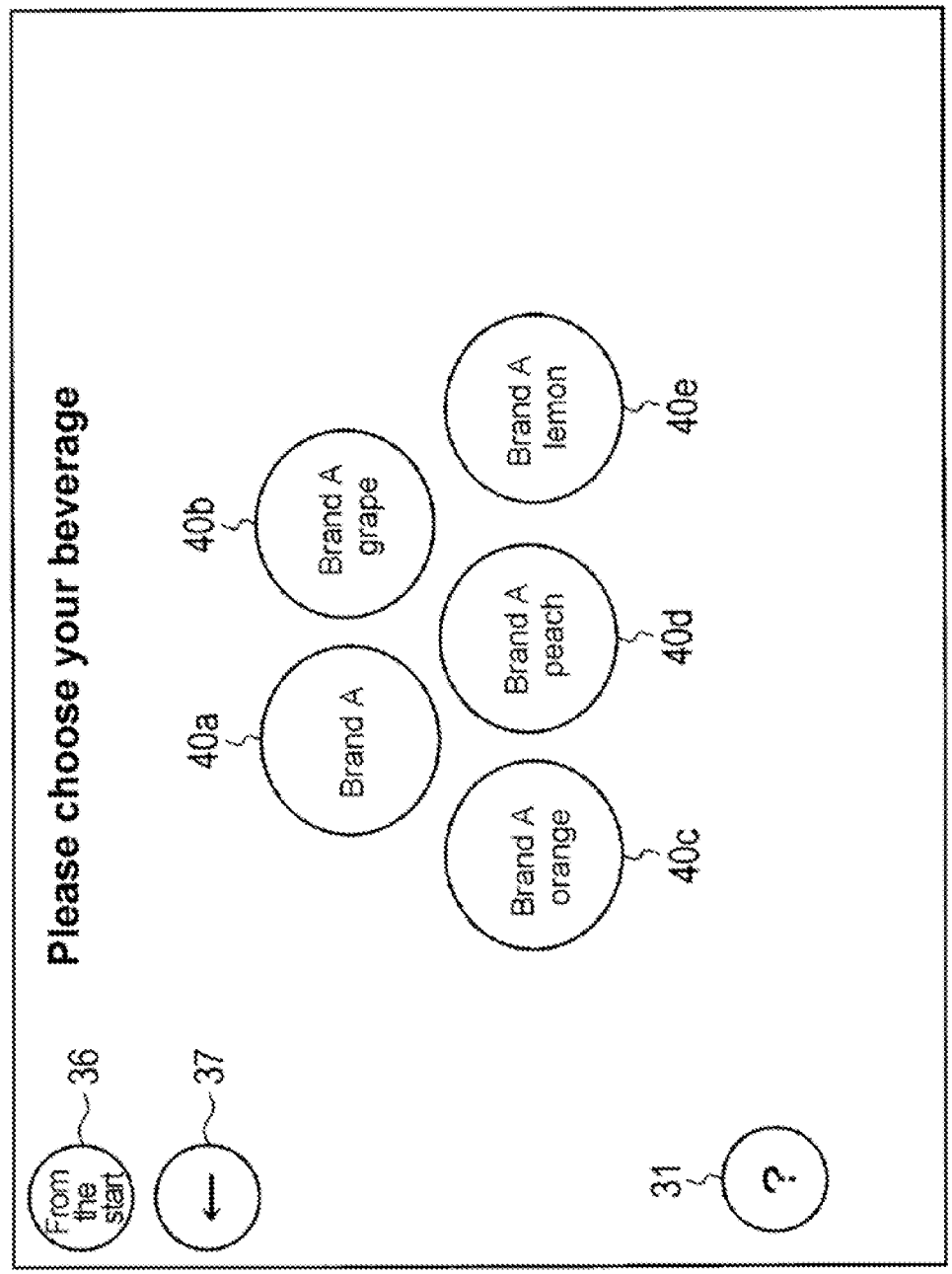
FIG. 12 shows a display example of a beverage selection screen according to Control Example 2 of the beverage supply apparatus according to an embodiment of the present application.

FIG. 12 shows an example of the beverage selection screen display. As is shown, the beverage selection buttons 40a-40e may be displayed on the beverage selection screen. The beverage selection buttons 40a-40e may be buttons that are depressed when the user selects a beverage. Here, the beverage that is selected by depression of the beverage selection button 40a may be a beverage in which a syrup of brand A is mixed with water and/or carbonated water. Furthermore, the beverages selected by depressing any of the beverage selection buttons 40b-40e may be beverages in which the syrup of brand A (main syrup) is mixed with water and/or carbonated water and a fruit-flavored syrup (topping syrup) (in other words, a flavor-added beverage). In the example of FIG. 12, the fruit flavor may be any of grape, orange, peach, or lemon.

Here, the control unit 20 determines that an operation to select a beverage has been received as a result of any of the beverage selection buttons 40a-40e having been depressed (step S17). In this case, the control unit 20 may cause the touch panel 2 to display an instruction to depress the physical button 3b corresponding to the nozzle 5b that discharges the beverage (in other words, the container placement location 4b) (step S3). For example, the control unit 20 may read out from the memory unit 21 image data of a depression instruction instructing the user to depress the physical button 3b and may cause the touch panel 2 to display that image.

Figure 13:
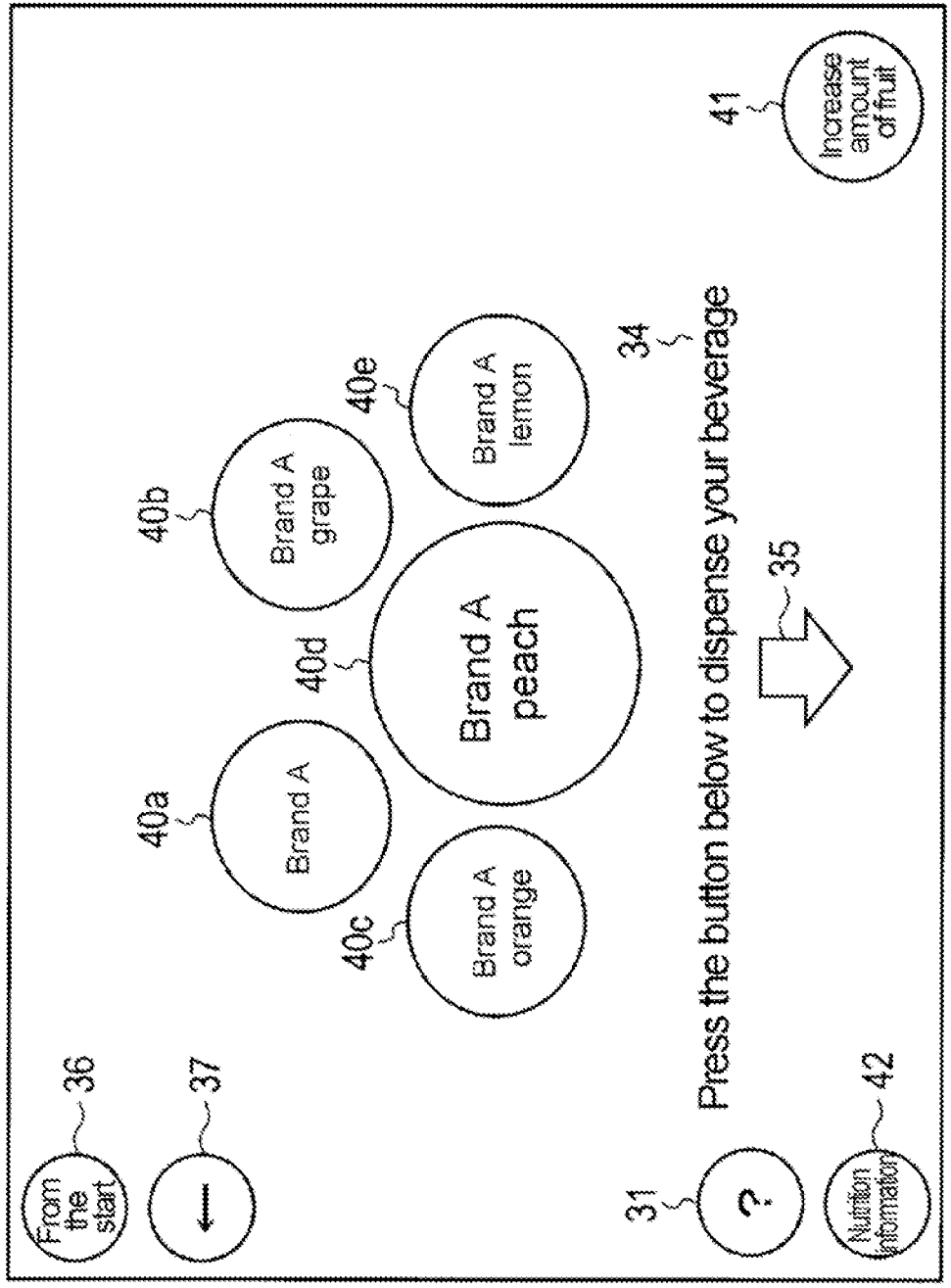
FIG. 13 shows a display example of a depression instruction screen according to Control Example 2 of the beverage supply apparatus according to an embodiment of the present application.

FIG. 13 shows an exemplary display of the image of the depression instruction including the image. Specifically, FIG. 13 shows an example of the depression instruction screen when a peach-flavored beverage of brand A has been selected. As is shown, the beverage selection button 40d may be displayed at a larger size on the depression instruction screen and the message 34 and the arrow 35 may be displayed underneath. The message 34 and the arrow 35 may be the same as those that were described above in Control Example 1. Displaying this kind of arrow 35 makes it easy for the user to ascertain that the physical button to be depressed is the physical button 3b and also makes it easy for the user to ascertain that the beverage will be supplied to the position of the container placement location 4b corresponding to the physical button 3b.

Moreover, a button 41 for increasing the amount of topping syrup may be displayed in the bottom right of the depression instruction screen shown in FIG. 13. The button 41 for increasing the amount of topping syrup may be a button that is depressed when the user wishes to make the fruit flavor stronger. When the button 41 for increasing the amount of topping syrup is depressed, the control unit 20 may increase the amount of topping syrup of the selected fruit flavor (peach flavor in the example in FIG. 13) to a predetermined amount and may cause this topping syrup to be discharged.

A nutrition information display button 42 may be displayed in the bottom left of the depression instruction screen shown in FIG. 13. The nutrition information display button 42 may be a button that is depressed when the user wishes to see the nutrition information of the selected beverage. When the nutrition information display button 42 is depressed by the user, the control unit 20 may read out from the memory unit 21 data relating to the nutrition information for the selected beverage and may cause the touch panel 2 to display that data.

Figure 14:
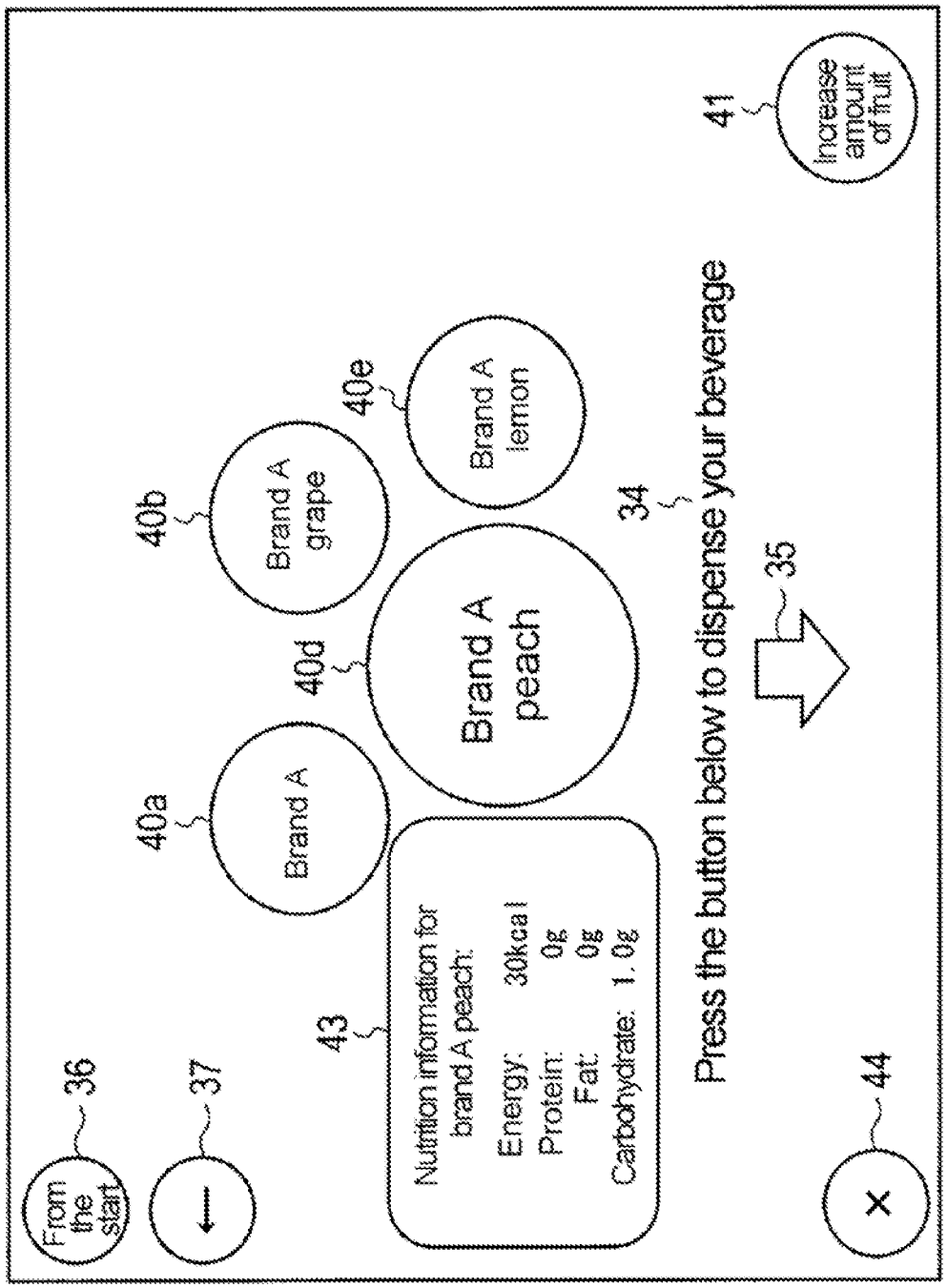
FIG. 14 shows a display example of nutrition information according to Control Example 2 of the beverage supply apparatus according to an embodiment of the present application.

FIG. 14 shows an example of this display. As is shown, nutrition information 43 for the selected beverage may be displayed on the touch panel 2. Furthermore, the user depresses a display end button 44 when he or she wishes to end the display of the nutrition information 43. As a result, the display may move from the screen shown in FIG. 14 to the depression instruction screen shown in FIG. 13.

If the user then depresses the physical button 3b, the control unit 20 may cause the selected beverage (in this case, a peach-flavored beverage of brand A, for example) to be discharged from the nozzle 5b while the physical button 3b is being depressed and also may cause the touch panel 2 to display the fact that the selected beverage is in the process of being discharged (step S4). For example, the control unit 20 may read out image data of a discharge-in-progress image stored in the memory unit 21 and may cause the touch panel 2 to display that image.

Figure 15:
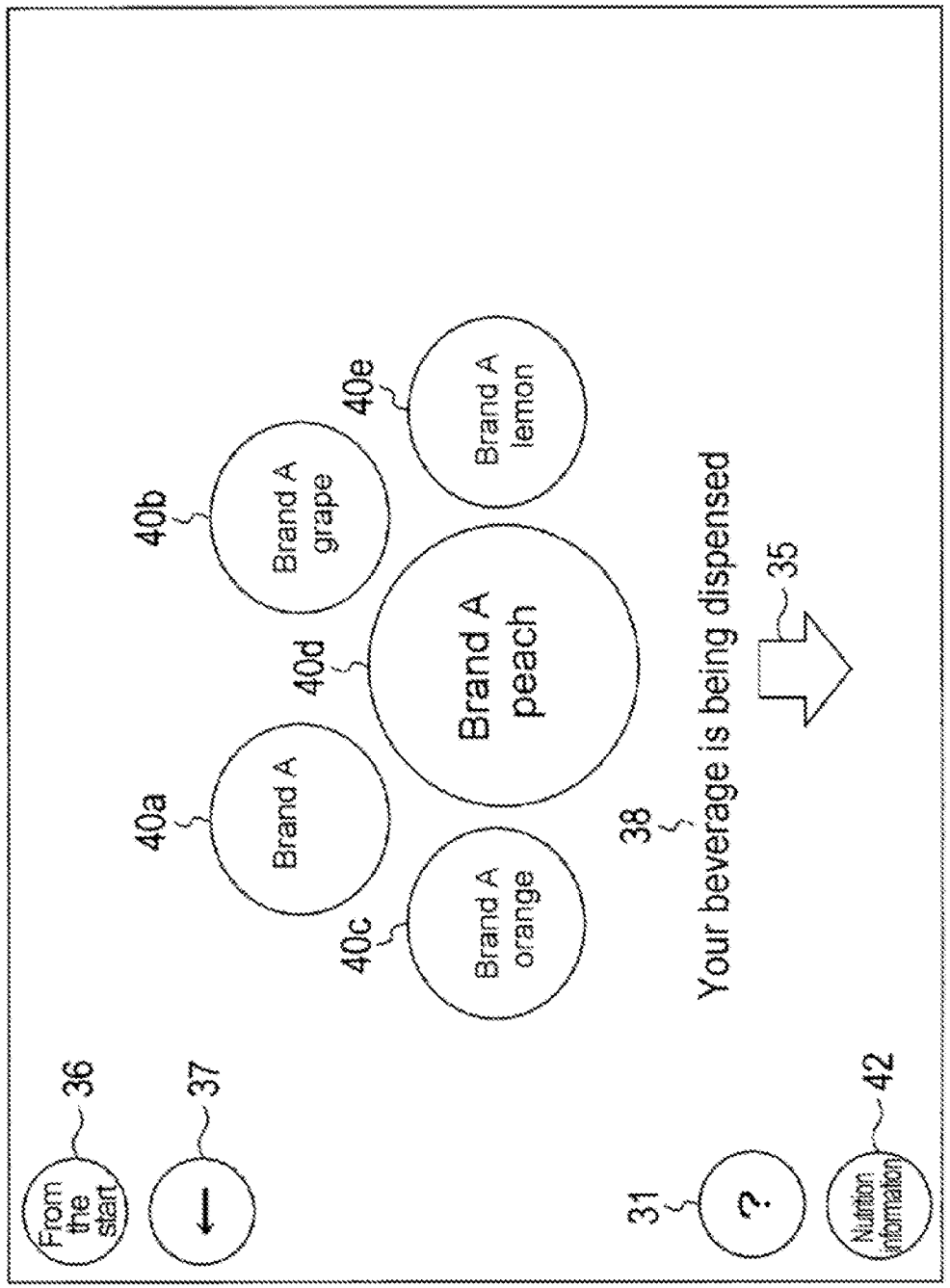
FIG. 15 shows a display example of a discharge-in-progress screen according to Control Example 2 of the beverage supply apparatus according to an embodiment of the present application.

FIG. 15 shows an example of the display of the discharge-in-progress image. Specifically, FIG. 15 shows an example of the discharge-in-progress screen when a peach-flavored beverage of brand A has been selected. As is shown, the message 38 and the arrow 35 may be displayed below the beverage selection button 40d that is displayed at a larger size on the discharge-in-progress screen. The message 38 may be the same as that described above in Control Example 1.

When the user then stops depressing the physical button 3b, the control unit 20 may cause discharge of the beverage from the nozzle 5b to stop and also may end the display indicating that the beverage is in the process of being discharged (step S5). In this case, the control unit 20 may control the touch panel 2 in such a way that the display moves from the discharge-in-progress screen shown in FIG. 15 to the depression instruction screen shown in FIG. 13. Here, the control unit 20 may save the beverage information for a given time (e.g., a few seconds) from the end of discharge of the beverage and also may control the touch panel 2 in such a way as to maintain the display of the depression instruction screen while awaiting another operation by the user to depress the physical button 3b.

If the user performs another operation to depress the physical button 3b, the control unit 20 may cause the same beverage as that which was discharged immediately before to be discharged from the nozzle 5b, in accordance with the saved information. As a result, the user may easily top up the beverage without again performing the abovementioned beverage selection operation. When a given time has elapsed from the end of discharge of the beverage, the control unit 20 may control the touch panel 2 in such a way that the display returns from the depression instruction screen shown in FIG. 13 to the home screen shown in FIG. 7.

The processing of step S18 and onwards will be described next. The control unit 20 may cause the touch panel 2 to display an instruction to depress the physical button 3a corresponding to the diluting water nozzle 5a and the syrup nozzle 50 (in other words, the container placement location 4a) (step S18). For example, the control unit 20 may read out from the memory unit 21 image data of a depression instruction instructing the user to depress the physical button 3a and may cause the touch panel 2 to display that image.

Figure 16:
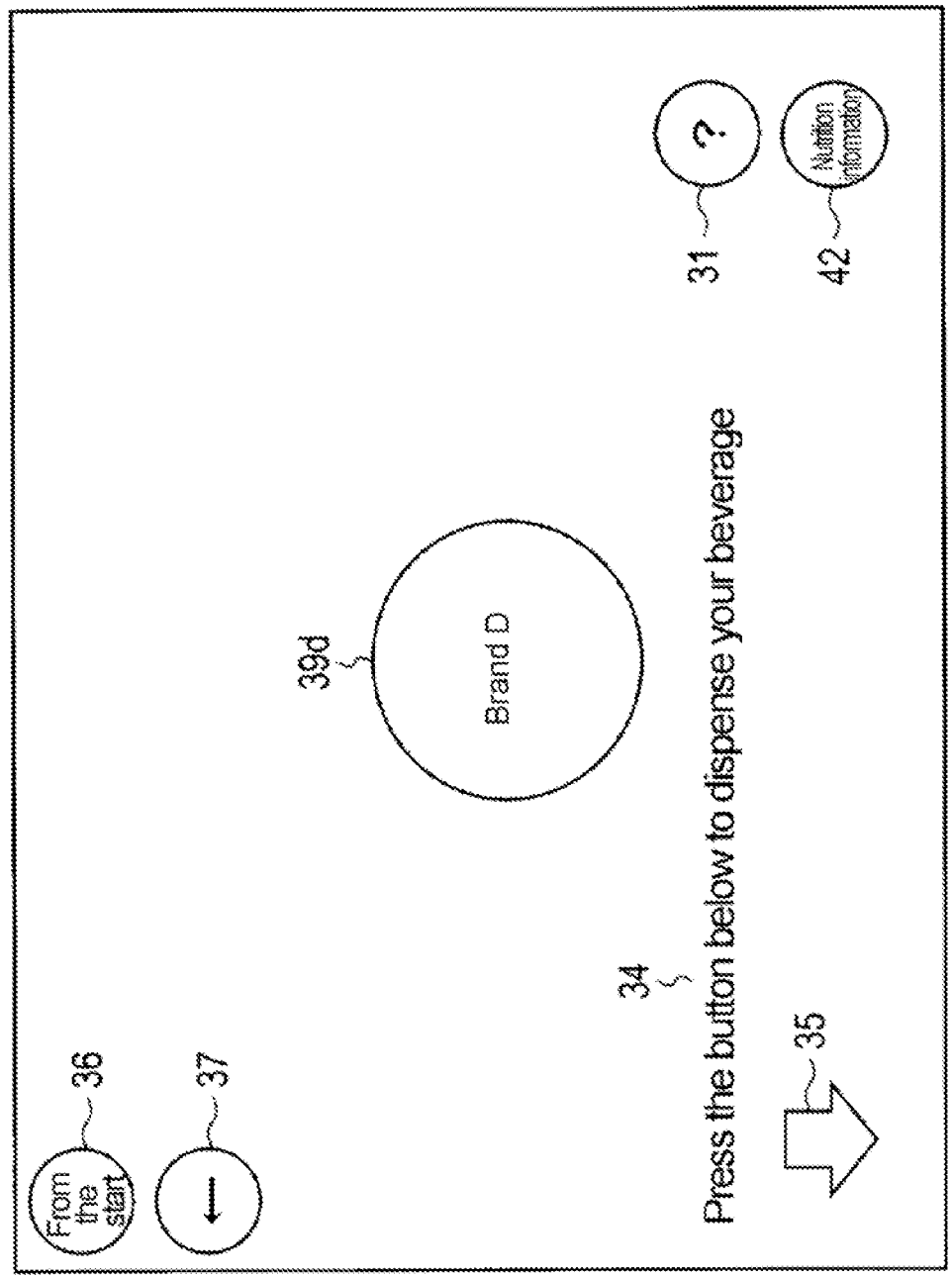
FIG. 16 shows a display example of a depression instruction screen according to Control Example 2 of the beverage supply apparatus according to an embodiment of the present application.

FIG. 16 shows an exemplary display of an image of a depression instruction including the image. Specifically, FIG. 16 shows an example of a depression instruction screen when a beverage of brand D (a beverage in which syrup of brand D is mixed with water and/or carbonated water) has been selected. As shown, the brand selection button 39d may be displayed at a larger size on this depression instruction screen and the message 34 and the arrow 35 may be displayed in the bottom left. The message 34 and the arrow 35 may be the same as those which were described above in Control Example 1. Displaying this kind of arrow 35 makes it easy for the user to ascertain that the physical button to be depressed is the physical button 3a and also makes it easy for the user to ascertain that the beverage will be supplied to the position of the container placement location 4a corresponding to the physical button 3a.

The processing in steps S19 and S20 that are performed after the physical button 3a has been depressed may be the same as the processing in steps S4 and S5 described above and this processing will be described in simple terms below. Diluting water may be discharged from the diluting water nozzle 5a while the physical button 3a is being depressed, syrup of brand D may be discharged from the syrup nozzle 50, and a discharge-in-progress screen may be displayed on the touch panel 2 (step S19). This discharge-in-progress screen is not depicted but the message 38 (see FIG. 9 and FIG. 15) may be displayed on the depression instruction screen in FIG. 16 instead of the message 34.

When the user then stops depressing the physical button 3a, discharge of the diluting water and the syrup may be stopped and the display may move from the discharge-in-progress screen to the depression instruction screen shown in FIG. 16 (step S20). Display of the depression instruction screen shown in FIG. 16 may be maintained for a given time from the end of discharge of the diluting water and the syrup after which the display of the depression instruction screen may move to display of the home screen shown in FIG. 7.

The processing of step S21 and onwards will be described next. The control unit 20 may causes the touch panel 2 to display an instruction to depress the physical button 3c corresponding to the diluting water nozzle 5c, the syrup nozzle 51, and the carbonated water nozzle 52 (in other words, the container placement location 4c) (step S21). For example, the control unit 20 may read out from the memory unit 21 image data of a depression instruction instructing the user to depress the physical button 3c and may cause the touch panel 2 to display that image.

Figure 17A:
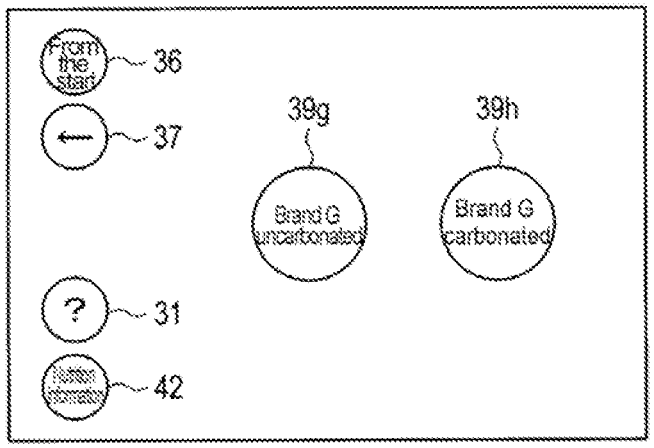
FIG. 17A shows a display example of a depression instruction screen according to Control Example 2 of the beverage supply apparatus according to an embodiment of the present application.
Figure 17B:
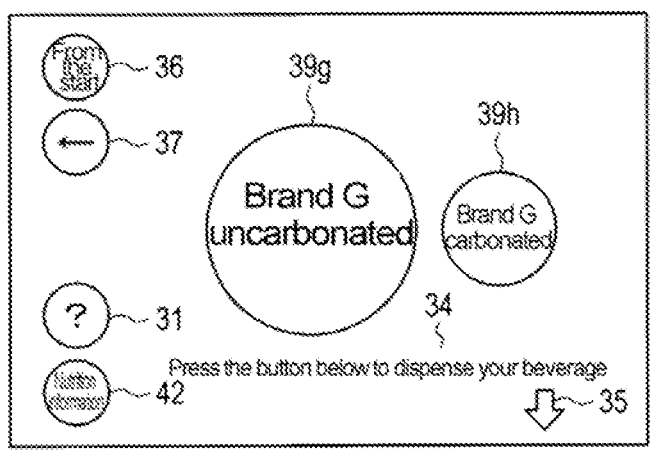
FIG. 17B shows a display example of a depression instruction screen according to Control Example 2 of the beverage supply apparatus according to an embodiment of the present application.
Figure 17C:
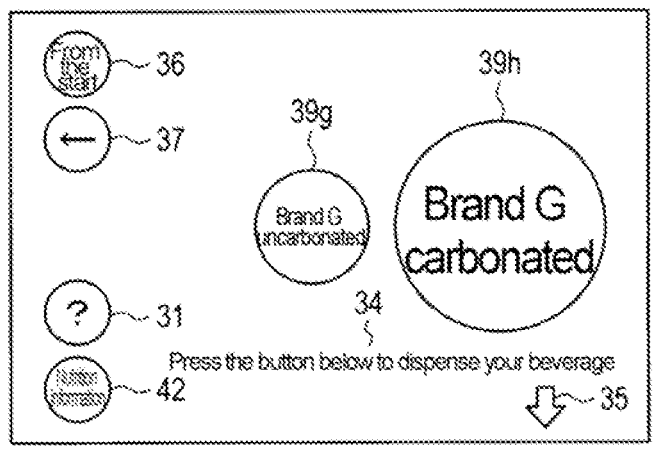
FIG. 17C shows a display example of a depression instruction screen according to Control Example 2 of the beverage supply apparatus according to an embodiment of the present application.

FIG. 17 shows an exemplary display of the depression instruction screen including the image. Specifically, FIG. 17 shows an example of the depression instruction screen when a beverage of brand G (a beverage in which a syrup of brand G is mixed with water and/or carbonated water) has been selected. As is shown, the brand selection buttons 39g, 39h may be displayed on the depression instruction screen. When either of the brand selection buttons 39g, 39h is selected, the selected brand selection button may be displayed at a larger size and the message 34 and the arrow 35 may be displayed below and to the right thereof. For example, if the brand selection button 39g has been depressed, the brand selection button 39g may be displayed at a larger size, as shown in FIG. 17B, and a beverage in which water is mixed with the syrup of brand G may be supplied. Likewise, if the brand selection button 39h has been depressed, the brand selection button 39h may be displayed at a larger size, as shown in FIG. 17C, and a beverage in which carbonated water is mixed with the syrup of brand G may be supplied. The message 34 and the arrow 35 may be the same as those described above in Control Example 1.

Displaying this kind of arrow 35 makes it easy for the user to ascertain that the physical button to be depressed is the physical button 3c and also makes it easy for the user to ascertain that the beverage will be supplied to the position of the container placement location 4c corresponding to the physical button 3c.

The processing in steps S22 and S23 that are performed after the physical button 3c has been depressed is the same as the processing in steps S4 and S5 described above and this processing will be described in simple terms below. While the physical button 3c is being depressed, the syrup of brand G may be discharged from the syrup nozzle 51, diluting water and/or carbonated water may be discharged from the diluting water nozzle 5c and/or the carbonated water nozzle 52, and the discharge-in-progress screen may be displayed on the touch panel 2 (step S22). This discharge-in-progress screen is not depicted but the message 38 (see FIG. 9 and FIG. 15) may be displayed in the depression instruction screen in FIG. 17 instead of the message 34.

When the user then stops depressing the physical button 3c, discharge of the diluting water and/or carbonated water and the syrup may be stopped and the display may move from the discharge-in-progress screen to the depression instruction screen shown in FIG. 17 (step S23). The display of the depression instruction screen shown in FIG. 17 then may be maintained for a given time from the end of discharge of the diluting water and/or carbonated water and syrup, after which the display may move from the depression instruction screen to the home screen shown in FIG. 7.

Control Example 3

Figure 18:
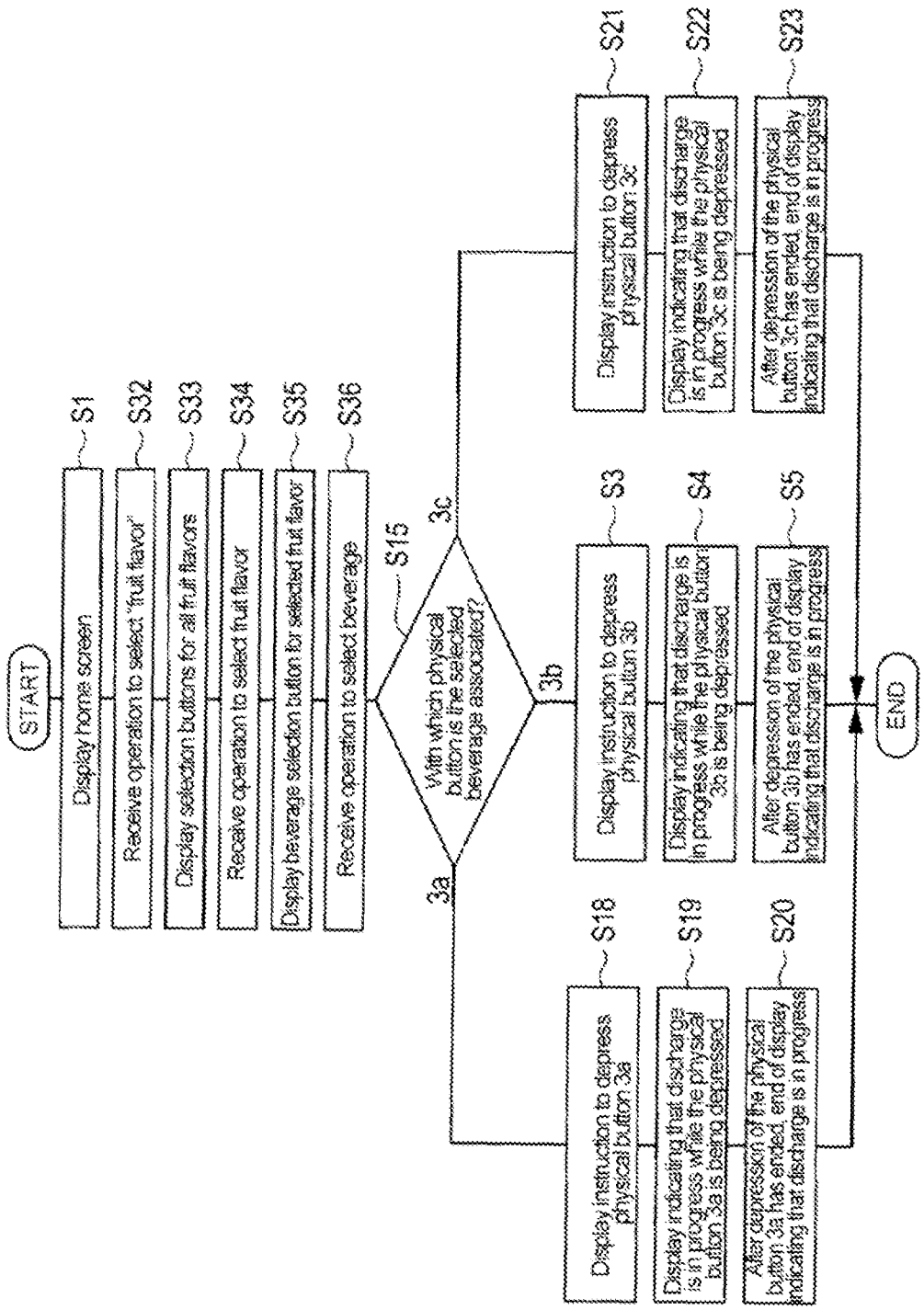
FIG. 18 is a flowchart showing Control Example 3 of the beverage supply apparatus according to an embodiment of the present application.

An example of control when the "fruit flavor" category shown in FIG. 7 is selected will be described next in the context of FIGS. 18-20. FIG. 18 is a flowchart showing this control example. Furthermore, FIG. 19 and FIG. 20 show examples of the display on the screen of the touch panel 2.

The control unit 20 may read out image data of the home screen stored in the memory unit 21 and may cause the touch panel 2 to display the home screen (step S1). The home screen shown in FIG. 7 may be displayed on the touch panel 2 as a result. Here, the control unit 20 may determine that an operation to select the "fruit flavor" category has been received as a result of the category selection button 30b having been depressed by the user (step S32). In this case, the control unit 20 may cause the touch panel 2 to display the selection buttons for all fruit flavors (step S33). For example, the control unit 20 may read out from the memory unit 21 image data of the fruit flavor selection screen including the selection buttons for all fruit flavors and may perform control in such a way that the screen is displayed on the touch panel 2.

Figure 19:
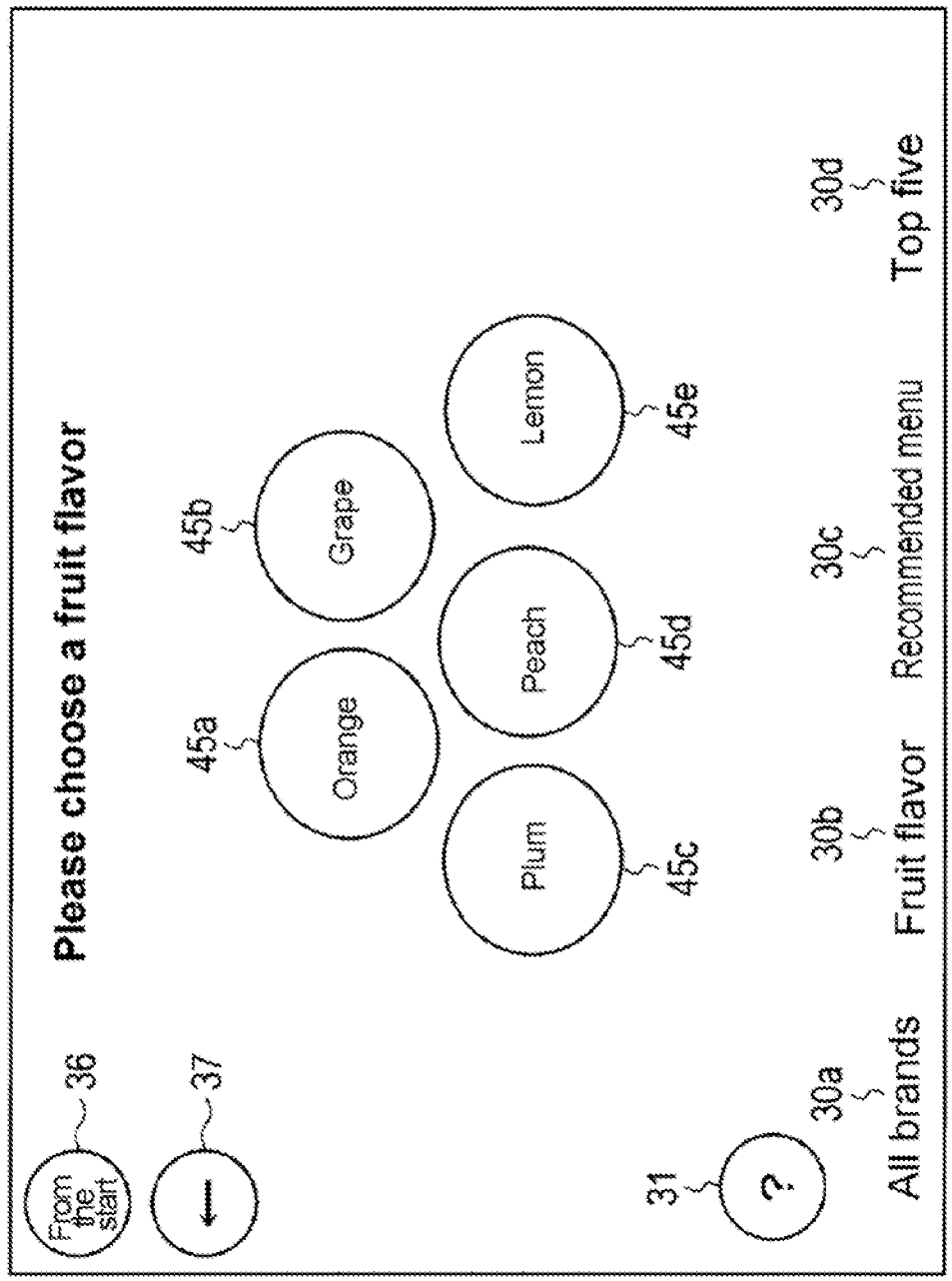
FIG. 19 shows a display example of a fruit-flavor selection screen according to Control Example 3 of the beverage supply apparatus according to an embodiment of the present application.
Figure 20:
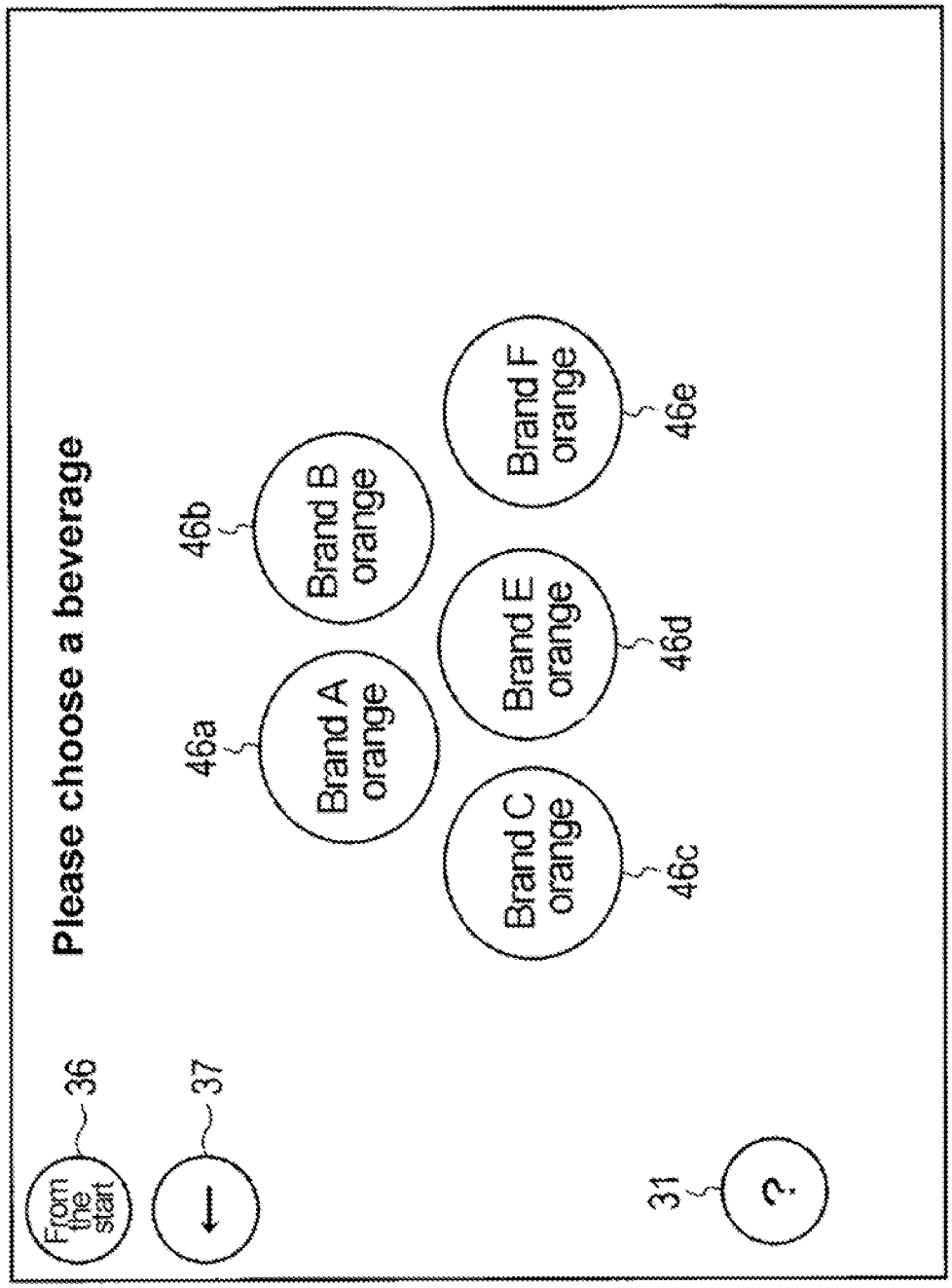
FIG. 20 shows a display example of a beverage selection screen according to Control Example 3 of the beverage supply apparatus according to an embodiment of the present application.

FIG. 19 shows an example of the display of the fruit flavor selection screen. As shown in FIG. 19, the fruit flavor selection buttons 45a-45e may be displayed on the fruit flavor selection screen. The fruit flavor selection buttons 45a-45e may be buttons that are depressed when the user selects the fruit flavor of the topping syrup. The fruit flavors selected by depression of the fruit flavor selection buttons 45a-45e may be orange, grape, plum, peach, and lemon, respectively.

It should be noted that this embodiment describes a case in which a syrup of the fruit flavor selected on the fruit flavor selection screen may be used as the topping syrup. The syrup also may be used as the main syrup. In this case, a beverage in which a syrup of the fruit flavor selected is mixed with water and/or carbonated water is discharged from the nozzle 5b.

Here, the control unit 20 determines that an operation to select a fruit flavor has been received as a result of any of the fruit flavor selection buttons 45a-45e having been depressed by the user (step S34). In this case, the control unit 20 may cause the touch panel 2 to display a beverage selection button for the fruit flavor selected (step S35). For example, the control unit 20 may read out from the memory unit 21 image data for the beverage selection screen including the beverage selection button for the fruit flavor selected and may cause the touch panel 2 to display that screen.

FIG. 20 shows an example of the display of the beverage selection screen. Specifically, FIG. 20 shows an example of the beverage selection screen when orange has been selected as the fruit flavor. As is shown, the beverage selection buttons 46a-46e may be displayed on the beverage selection screen. The beverage selection buttons 46a-46e may be buttons that are depressed when a user selects a beverage. The beverage selected as a result of any of the beverage selection buttons 46a-46e being depressed may be a beverage (flavor-added beverage) in which a syrup (main syrup) of any of brands A-C, E, and F, water, and/or carbonated water, and the orange syrup (topping syrup) selected on the fruit flavor selection screen in FIG. 19 are mixed.

Here, the control unit 20 determines that an operation to select a beverage has been received as a result of any of the beverage selection buttons 46a-46e having been depressed by the user (step S36). In this case, the control unit 20 may specify the physical button corresponding to the nozzle for discharging the selected beverage, in accordance with the table 22 read out from the memory unit 21 (step S15).

If the selected beverage is associated with the physical button 3a (step S15: 3a), the processing of step S18 and onwards may be implemented. If the selected beverage is associated with the physical button 3c (step S15: 3c), the processing of step S21 and onwards may be implemented. Furthermore, if the selected beverage is associated with the physical button 3b (step S15: 3b), the processing of step S3 and onwards may be implemented.

The processing of steps S18-20 and steps S21-23 in FIG. 18 may be the same as the processing of steps S18-20 and steps S21-23 in FIG. 10 described above in Control Example 2 and such processing therefore will not be described again. Furthermore, the processing of steps S3-S5 in FIG. 18 also may be basically the same as the processing of steps S3-S5 described above in Control Example 2 and this processing therefore will be described in simple terms below.

The control unit 20 may cause the touch panel 2 to display an instruction to depress the physical button 3b corresponding to the nozzle 5b that discharges the beverage (in other words, the container placement location 4b) (step S3). The description given here relates to a case in which the beverage selected on the beverage selection screen shown in FIG. 20 is an orange-flavored beverage of brand E. In this case, a depression instruction screen that is substantially the same as the depression instruction screen in FIG. 13 described above is displayed, although this is not depicted. That is to say, the beverage selection buttons 46a-46e may be displayed on the depression instruction screen instead of the beverage selection buttons 40a-40e displayed on the depression instruction screen shown in FIG. 13 and the beverage selection button 46d may be displayed at a larger size.

In this case too, displaying the arrow 35 on the depression instruction screen makes it easy for the user to ascertain that the physical button to be depressed is the physical button 3b and also makes it easy for the user to ascertain that the beverage will be supplied to the position of the container placement location 4b corresponding to the physical button 3b.

If the user then depresses the physical button 3b, an orange-flavored beverage of the brand E may be discharged from the nozzle 5b while the physical button 3b is being depressed and the discharge-in-progress screen may be displayed on the touch panel 2 (step S4). This discharge-in-progress screen is not depicted but it is substantially the same as the discharge-in-progress screen shown in FIG. 15.

That is to say, the beverage selection buttons 46a-46e may be displayed on this discharge-in-progress screen instead of the beverage selection buttons 40a-40e displayed on the discharge-in-progress screen shown in FIG. 15 and the beverage selection button 46d may be displayed at a larger size.

When the user then stops depressing the physical button 3b, discharge of the beverage may be stopped and the display of the discharge-in-progress screen may move to display of the depression instruction screen (step S20). The display of the depression instruction screen may be maintained for a given time from the end of discharge of the beverage, after which display of the depression instruction screen may move to display of the home screen shown in FIG. 7.

Control Example 4

Figure 21:
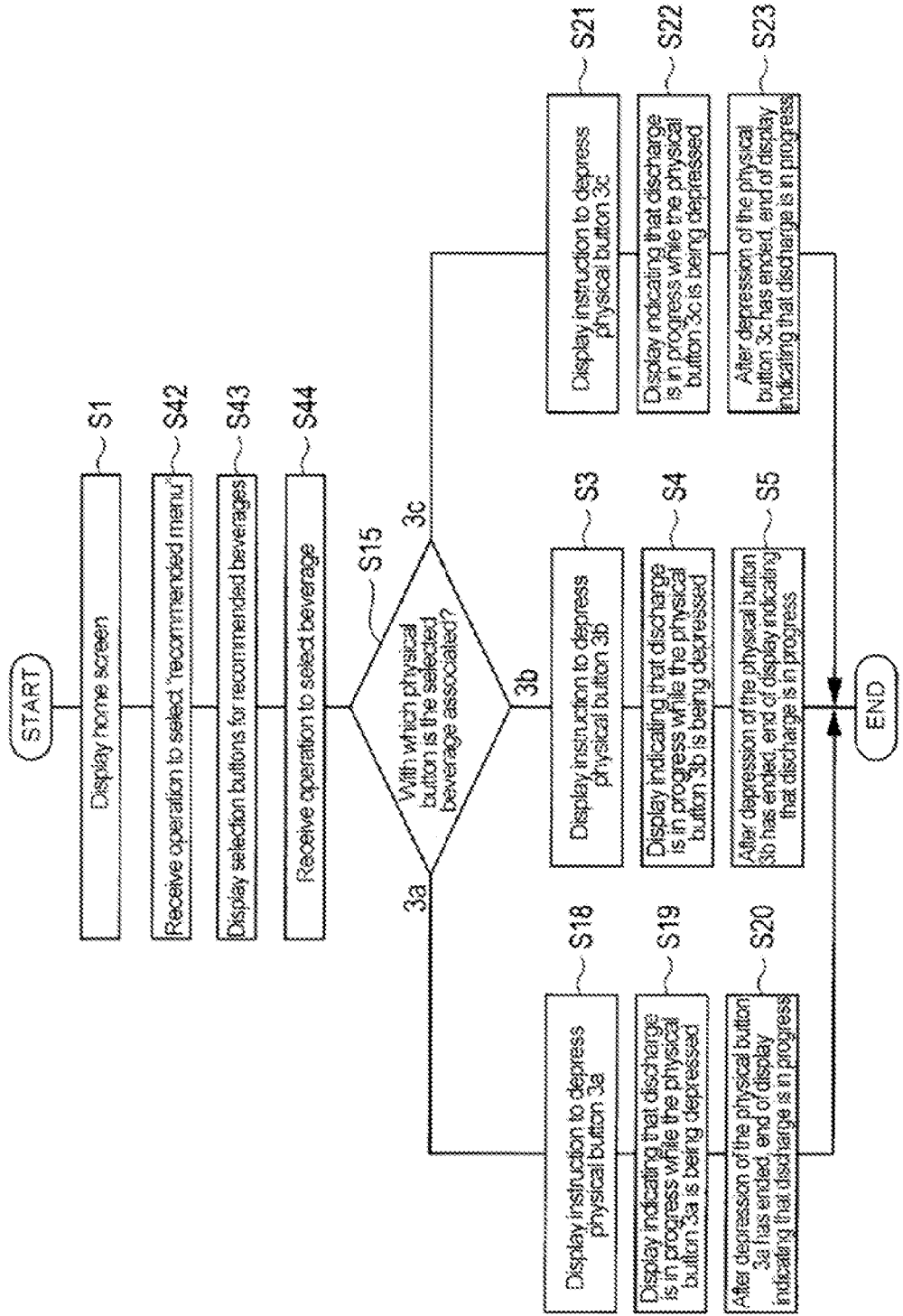
FIG. 21 is a flowchart showing Control Example 4 of the beverage supply apparatus according to an embodiment of the present application.

An example of control when the "recommended menu" category shown in FIG. 7 is selected will be described next in the context of FIG. 21 and FIG. 22. FIG. 21 is a flowchart showing this control example. Furthermore, FIG. 22 shows an example of the screen display on the touch panel 2.

The control unit 20 may read out image data of the home screen stored in the memory unit 21 and may cause the touch panel 2 to display the home screen (step S1). The home screen shown in FIG. 7 may be displayed on the touch panel 2 as a result. Here, the control unit 20 may determine that an operation to select the "recommended menu" category has been received as a result of the category selection button 30c having been depressed by the user (step S42). In this case, the control unit 20 may cause the touch panel 2 to display the beverage selection buttons for selecting recommended beverages (step S43). For example, the control unit 20 may read out from the memory unit 21 image data of the beverage selection screen including the beverage selection buttons and may cause the touch panel 2 to display that screen.

Figure 22:
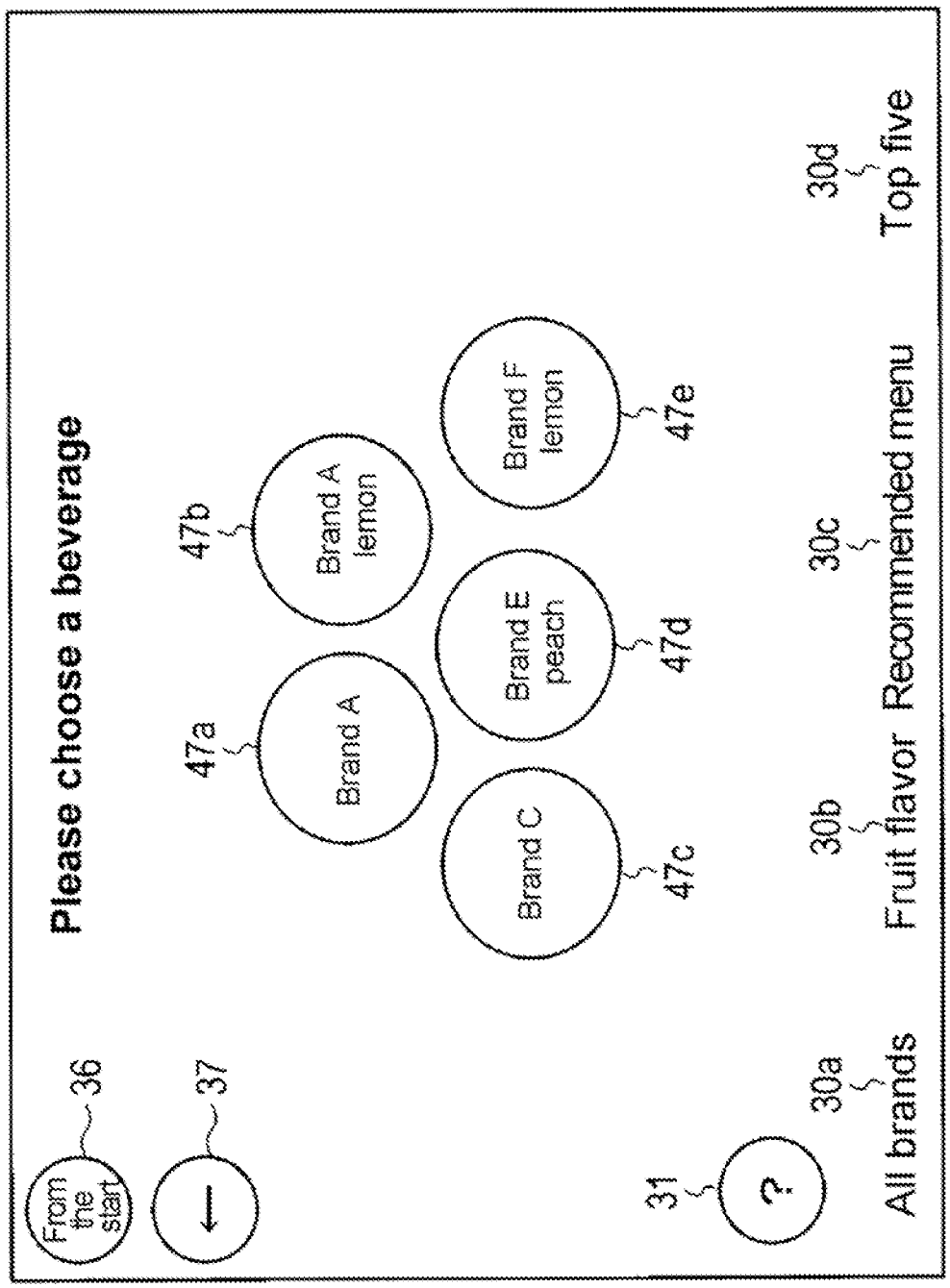
FIG. 22 shows a display example of a beverage selection screen according to Control Example 4 of the beverage supply apparatus according to an embodiment of the present application.

FIG. 22 shows an example of the display of the beverage selection screen. As shown in FIG. 22, beverage selection buttons 47a-47e may be displayed on the beverage selection screen. The beverage selection buttons 47a-47e may be buttons that indicate recommended beverages to the user and may be depressed when the user selects the desired beverage. The recommended beverages may be determined in advance. Here, the control unit 20 may determine that an operation to select a beverage has been received as a result of any of the beverage selection buttons 47a-47e having been depressed by the user (step S44).

The processing of step S15 and onwards may be the same as that described above in Control Example 2 and will therefore not be described again here. Rather, a brief description will be given below of an example of the screen displayed in the processing of steps S3 and S4. By way of example, a description will be given below of a case in which the beverage selected on the beverage selection screen shown in FIG. 22 is a peach-flavored beverage of brand E.

In this case, a depression instruction screen that is substantially the same as the depression instruction screen shown in FIG. 13 may be displayed on the touch panel 2 in the processing of step S3, although this is not depicted. That is to say, the beverage selection buttons 47a-47e may be displayed on the depression instruction screen instead of the beverage selection buttons 40a-40e displayed on the depression instruction screen shown in FIG. 13, and the beverage selection button 47d may be displayed at a larger size.

Displaying the arrow 35 makes it easy for the user to ascertain that the physical button to be depressed is the physical button 3b and also makes it easy for the user to ascertain that the beverage will be supplied to the position of the container placement location 4b corresponding to the physical button 3b.

Furthermore, a discharge-in-progress screen that is substantially the same as the discharge-in-progress screen shown in FIG. 15 may be displayed on the touch panel 2 in the processing of step S4, although this is not depicted. That is to say, the beverage selection buttons 47a-47e may be displayed on the discharge-in-progress screen instead of the beverage selection buttons 40a-40e displayed on the discharge-in-progress screen shown in FIG. 15, and the beverage selection button 47d may be displayed at a larger size.

It should be noted that this control example relates to a case in which the beverage is selected via the "recommended menu" category displayed on the home screen shown in FIG. 7, but the same processing also is carried out when a beverage is selected via the "top five" category displayed on the home screen. In this case, the top five beverages (e.g., those ranked from 1-5 in terms of sales) that are predetermined may be displayed on the beverage selection screen shown in FIG. 22.

As described above, according to this embodiment, the user may be notified of the physical button corresponding to the nozzle that discharges a beverage selected on a touch panel 2. As a result, the user can easily ascertain the button to be depressed, the nozzle from which the beverage will be discharged, and the container placement location corresponding to that nozzle, whatever the nature of the beverage selection screen displayed on the touch panel 2.

An embodiment of the present application has been described above, but the present application is not limited to the abovementioned embodiment and various modifications may be made. For example, in the embodiment described above, the position of the physical button to be depressed is notified by displaying the arrow 35 on the touch panel 2. Instead of or in addition to displaying the arrow 35 on the touch panel 2, the control unit 20 also may control the physical button 3a-3c to be depressed in order to notify the user of the physical button 3a-3c to be depressed. Specifically, the control unit may notify the user by causing the physical button 3a-3c to be depressed to illuminate or flash. Furthermore, the control unit 20 may cause the touch panel 2 to display the arrow 35 while also causing the physical button 3a-3c to be depressed to illuminate or flash.

Whatever kind of processing is used, the user can easily ascertain the button to be depressed, the nozzle from which the beverage will be discharged, and the container placement location corresponding to that nozzle, whatever the nature of the beverage selection screen displayed on the touch panel 2, in the same way as when the touch panel 2 displays the arrow 35.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A beverage supply apparatus that supplies two or more kinds of beverages, the beverage supply apparatus comprising:
  a plurality of nozzles that discharges the two or more kinds of beverages;
  a touch panel that displays selection options of the two or more kinds of beverages and receives a selection operation for selecting one of the two or more kinds of beverages;
  a plurality of physical buttons that corresponds to the plurality of nozzles and that receives a request to discharge the beverage selected by the selection operation; and
  a control section that specifies a physical button corresponding to a nozzle from which the beverage selected by the selection operation is discharged from among the plurality of the physical buttons, the control section controlling the touch panel to indicate the specified physical button;
  wherein the control section controls the nozzle corresponding to the specified physical button to discharge the beverage selected by the selection operation while the specified physical button is receiving the selection operation; and
  wherein the control section holds information of the beverage selected by the selection operation and continues the indication of the specified physical button for a predetermined period after discharge of the beverage selected by the selection operation is completed.

2. The beverage supply apparatus according to claim 1, wherein the control section controls the nozzle corresponding to the specified physical button to discharge the beverage selected by the selection operation when the specified physical button again receives the selection operation.

3. The beverage supply apparatus according to claim 1, wherein the plurality of nozzles comprises one or more of a diluting water nozzle, a carbonated water nozzle, and a syrup nozzle.

4. The beverage supply apparatus according to claim 1, wherein the selection options comprise a touch button to receive a category selection.

5. The beverage supply apparatus according to claim 4, wherein the selection options comprise a touch button to receive a recommended menu.

6. The beverage supply apparatus according to claim 1, wherein the selection options comprise a touch button to receive a brand selection.

7. The beverage supply apparatus according to claim 1, wherein the selection options comprise a touch button to receive a fruit flavor selection.

8. The beverage supply apparatus according to claim 1, wherein the touch panel comprises a touch button to receive a carbonated water selection and a non-carbonated water selection.

9. The beverage supply apparatus according to claim 1, wherein the touch panel comprises a touch button to receive a topping selection.

10. The beverage supply apparatus according to claim 1, wherein the touch panel comprises a touch button to receive a help selection and a return selection.

11. The beverage supply apparatus according to claim 1, wherein the touch panel comprises a touch button to receive an indication selection.

12. The beverage supply apparatus according to claim 1, wherein the control section controls the specified physical button to indicate the specified physical button.

* * * * *